United States Patent
Iseki et al.

(10) Patent No.: US 11,479,832 B2
(45) Date of Patent: Oct. 25, 2022

(54) METHOD FOR SMELTING OXIDE ORE

(71) Applicant: SUMITOMO METAL MINING CO., LTD., Tokyo (JP)

(72) Inventors: Takashi Iseki, Niihama (JP); Yukihiro Goda, Niihama (JP); Jun-ichi Kobayashi, Niihama (JP); Shuji Okada, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 711 days.

(21) Appl. No.: 16/093,339

(22) PCT Filed: Apr. 19, 2017

(86) PCT No.: PCT/JP2017/015776
§ 371 (c)(1),
(2) Date: Oct. 12, 2018

(87) PCT Pub. No.: WO2017/183666
PCT Pub. Date: Oct. 26, 2017

(65) Prior Publication Data
US 2019/0144971 A1 May 16, 2019

(30) Foreign Application Priority Data

Apr. 22, 2016 (JP) .............................. JP2016-085963
Apr. 27, 2016 (JP) .............................. JP2016-089470
Apr. 18, 2017 (JP) .............................. JP2017-082195

(51) Int. Cl.
*C22B 23/02* (2006.01)
*C22B 1/245* (2006.01)
*C22B 5/10* (2006.01)

(52) U.S. Cl.
CPC .............. *C22B 23/02* (2013.01); *C22B 1/245* (2013.01); *C22B 5/10* (2013.01)

(58) Field of Classification Search
CPC ... C21B 13/0053; C21B 13/006; C21B 13/10; C21B 13/105; C22B 1/244; C22B 1/245; C22B 23/02; C22B 23/023; C22B 5/10
(Continued)

(56) References Cited

U.S. PATENT DOCUMENTS 2,111,344 A    3/1938  Weitzenkorn
4,588,438 A    5/1986  Fujishige et al.
(Continued)

FOREIGN PATENT DOCUMENTS

CA    2956509 A1    2/2016
CN    1294281 C     1/2007
(Continued)

OTHER PUBLICATIONS

International Search Report dated May 30, 2017, issued for PCT/JP2017/015776.
(Continued)

Primary Examiner — Jie Yang
(74) Attorney, Agent, or Firm — Locke Lord LLP; James E. Armstrong, IV; Nicholas J. DiCeglie, Jr.

(57) ABSTRACT

Provided is a smelting method for producing metal by reducing a mixture that includes an oxide ore such as nickel oxide ore, wherein it is possible to improve productivity by raising the metal recovery rate as well as to inexpensively and efficiently produce high-quality metal. The present invention is a smelting method in which: an oxide ore and a carbonaceous reducing agent are mixed; the resulting mixture is heated and subjected to a reduction treatment; and metal and slag, which are reduction products, are obtained, wherein the reduction treatment is carried out in a state in which one or more surface deposits selected from carbonaceous reducing agents, metal oxides, and oxidation inhibitors are deposited on the surface of the mixture.

5 Claims, 3 Drawing Sheets

(58) Field of Classification Search
USPC .......................................................... 75/629
See application file for complete search history.

(56) References Cited

U.S. PATENT DOCUMENTS

| | | | |
|---|---|---|---|
| 6,129,777 A * | 10/2000 | Fuji ........................ | C21B 13/10 75/484 |
| 8,333,823 B2 * | 12/2012 | Iwasaki .................. | C22B 1/245 75/484 |
| 8,372,179 B2 | 2/2013 | Barnes et al. | |
| 9,970,085 B2 | 5/2018 | Takahashi et al. | |
| 2001/0037703 A1 | 11/2001 | Fuji et al. | |
| 2003/0037485 A1 | 2/2003 | Carnegie et al. | |
| 2005/0211020 A1 | 9/2005 | Sugitatsu et al. | |
| 2007/0113708 A1 | 5/2007 | Sugitatsu et al. | |
| 2009/0249921 A1 | 10/2009 | Osborne et al. | |
| 2013/0074654 A1 | 3/2013 | Ito | |
| 2013/0111809 A1 | 5/2013 | Kamikawa et al. | |
| 2016/0237514 A1 | 8/2016 | Ito et al. | |
| 2017/0152585 A1 | 6/2017 | Takahashi et al. | |
| 2017/0204496 A1 | 7/2017 | Takahashi et al. | |
| 2017/0211166 A1 | 7/2017 | Takahashi et al. | |
| 2017/0306444 A1 | 10/2017 | Takahashi et al. | |
| 2019/0119779 A1 * | 4/2019 | Iseki ....................... | C21B 13/08 |
| 2019/0144971 A1 | 5/2019 | Iseki et al. | |

FOREIGN PATENT DOCUMENTS

| | | |
|---|---|---|
| CN | 101037713 A | 9/2007 |
| CN | 101392330 A | 3/2009 |
| CN | 101748298 B | 10/2012 |
| CN | 104313227 A | 1/2015 |
| CN | 104404246 A | 3/2015 |
| EP | 1426451 A1 | 6/2004 |
| EP | 1749894 A1 | 2/2007 |
| EP | 2325341 A1 | 5/2011 |
| EP | 2876174 A1 | 5/2015 |
| EP | 3162904 A1 | 5/2017 |
| GB | 1569311 A | 6/1980 |
| JP | S63-145704 A | 6/1988 |
| JP | H01-162729 A | 6/1989 |
| JP | H03-047927 A | 2/1991 |
| JP | H04-210432 A | 7/1992 |
| JP | H07-286205 A | 10/1995 |
| JP | H10-030106 A | 2/1998 |
| JP | H11-092810 A | 4/1999 |
| JP | 2001-098313 A | 4/2001 |
| JP | 2001-181719 A | 7/2001 |
| JP | 2001-294921 A | 10/2001 |
| JP | 2002-241822 A | 8/2002 |
| JP | 2003-089812 A | 3/2003 |
| JP | 2004-156140 A | 6/2004 |
| JP | 2005-194544 A | 7/2005 |
| JP | 2005-220398 A | 8/2005 |
| JP | 2005-314745 A | 11/2005 |
| JP | 2006-124793 A | 5/2006 |
| JP | 2006-265569 A | 10/2006 |
| JP | 2007-231418 A | 9/2007 |
| JP | 2011-256414 A | 12/2011 |
| JP | 2012-017526 A | 1/2012 |
| JP | 2016-030835 A | 3/2016 |
| JP | 2017-052993 A | 3/2017 |
| WO | 2015/045670 A1 | 4/2015 |
| WO | 2016/013355 A1 | 1/2016 |
| WO | 2016/017347 A1 | 2/2016 |
| WO | 2016/017348 A1 | 2/2016 |
| WO | 2016/056362 A1 | 4/2016 |

OTHER PUBLICATIONS

Office Action dated Jul. 23, 2019, issued in the CN Patent Application No. 201780022808.1.
Extended European Search Report issued in the EP Patent Application No. EP20197570.3, dated Oct. 20, 2020.
Extended European Search Report issued in the EP Patent Application No. EP20197857.4, dated Oct. 20, 2020.
Iron Alloy Process Technology, edited by Wei Dai and Shuri, pp. 66-70, Beijing: Metallurgical Industry Publishing Company, Jun. 2015. (cited in the Nov. 3, 2020 Office Action issued for CN201780022808.1; English translation of the pertinent section of Decision of Refusal as a concise explanation of the relevance is attached).
Decision of Refusal issued in the CN Patent Application No. CN201780022808.1, dated Nov. 3, 2020.
Extended European Search Report dated Feb. 14, 2020, issued in the EP Patent Application No. 17786003.8.
Partial Supplementary European Search Report dated Nov. 4, 2019, issued in the EP Patent Application No. 17786003.8.
Final Action issued in the U.S. Appl. No. 16/094,493, dated May 13, 2022.
Hideki Tomiyama : Kneading simulation of the extrusion molding machine, Japan Society of Rubber, Japan, Society of Rubber, Japan, Dec. 31, 2016 ; vol. 89, No. 12, p. 368-374.
Shin Hotani et al., Continuous kneader for polyolefin, and 2 shaft extruder, Kobe Steel Research, Japan, Kobe Steel, Ltd., Jan. 30, 2008, vol. 58, No. 2, p. 74-80.
Decision of Refusal issued in the JP Patent Application No. 2017-045469, dated Sep. 7, 2021 (Includes Explanation of Relevance of Yomiyama reference).
Office Action issued in the AU Patent Application No. 2020203209, dated Jan. 22, 2021.
Office Action issued in the AU Patent Application No. 2020203208 dated Jan. 8, 2021.
Extended European Search Report issued in the EP Patent Application No. EP20196074.7, dated Oct. 6, 2020.
Extended European Search Report issued in the EP Patent Application No. EP20197015.9, dated Oct. 16, 2020.
Extended European Search Report issued in the EP Patent Application No. EP17789626.3, dated Feb. 19, 2020.
Notification of Reasons for Refusal issued in the JP Patent Application No. 2016-089469, dated Mar. 17, 2020.
Othmer K Ed—Mark H F et al., "Encyclopedia of Chemical Technology Third Edition, vol. 21". Passage Text, Jan. 1, 1978, Kirk—Othmer Encyclopedia of Chemical Technology. Silver and Silver Alloys to Sulfolanes and Sulfones, New York, Wiley & Sons, US, pp. 77-105, XP002054080.
Partial Supplementary European Search Report issued in the EP Patent Application No. EP17789626.3, dated Nov. 4, 2019.
Office Action issued in the CA Patent Application No. CA3021829, dated Nov. 26, 2019.
Office Action issued in the CN Patent Application No. CN201780022977.5, dated Jul. 23, 2019.
International Search Report issued for International Application No. PCT/JP2017/016620 dated Jul. 11, 2017.

* cited by examiner

METHOD FOR SMELTING OXIDE ORE

TECHNICAL FIELD

The present invention relates to an oxide ore smelting method, and more particularly it relates to an oxide ore smelting method for obtaining a reduction product containing a metal by mixing an oxide ore such as nickel oxide ore with a reducing agent and reducing the oxide ore at a high temperature.

BACKGROUND ART

As a method for smelting nickel oxide ore which is one kind of oxide ore and called limonite or saprolite, a dry smelting method in which nickel mat is produced by using an smelting furnace, a dry smelting method in which ferronickel, which is an alloy of iron and nickel, is produced by using a rotary kiln or a movable hearth furnace, a hydrometallurgical method in which a mixed sulfide is produced by using an autoclave, and the like are known.

A treatment for forming nickel oxide ore of a raw material into a lump product by crushing the nickel oxide ore into a proper size and the like is performed as a pretreatment in order to advance the reaction particularly in a case in which nickel oxide ore is reduced and smelted by a dry smelting method among the various methods described above.

Specifically, when nickel oxide ore is formed into a lump product, that is, a lump is formed from a powdery or granular ore, it is general that the nickel oxide ore is mixed with other components, for example, a binder, a reducing agent such as coke to prepare a mixture and the mixture is further subjected to moisture adjustment and the like, then charged into a lump product manufacturing machine, and formed into a lump product (indicating a pellet, a briquette, or the like. Hereinafter simply referred to as the "pellet") having, for example, one side or a diameter of about 10 mm to 30 mm.

The pellet obtained as a lump product is required to exhibit gas permeability to a certain extent in order to "emit" the moisture contained. Furthermore, the composition of the reduction product to be obtained is ununiform and a trouble that the metal is dispersed or unevenly distributed is caused when the reduction does not uniformly proceed in the pellet in the subsequent reduction treatment. For this reason, it is important to uniformly mix the mixture when fabricating pellets or to maintain the temperature as constant as possible when reducing the pellets obtained.

In addition, it is also a significantly important technique to coarsen the metal (ferronickel) to be generated by the reduction treatment. It is difficult to separate the ferronickel from the slag to be generated at the same time, and the recovery rate (yield) as ferronickel greatly decreases in a case in which the ferronickel generated has a fine size of, for example, several tens of micrometers to several hundreds of micrometers or less. For this reason, a treatment for coarsening ferronickel after being reduced is required.

Furthermore, it is also an important technical problem how the smelting cost can be suppressed low, and a continuous treatment that can be operated in a compact facility is desired.

For example, Patent Document 1 discloses a technique intended to further enhance the productivity of granular metal when producing a granular metal by heating an agglomerated product containing a metal oxide and a carbonaceous reducing agent and thus reducing and melting the metal oxide contained in the agglomerated product. Specifically, a method for producing a granular metal is disclosed in which an agglomerated product containing a metal oxide and a carbonaceous reducing agent is supplied onto the hearth of a moving bed type reduction melting furnace and heated to reduce and melt the metal oxide and the granular metal obtained is cooled, then discharged to the outside of the furnace, and recovered. Moreover, this technique is characterized in that an agglomerated product having an average diameter of 19.5 mm or more and 32 mm or less is supplied onto the hearth when performing heating by setting the base density of the agglomerated product on the hearth to 0.5 or more and 0.8 or less where the base density denotes the relative value of the projected area ratio of the agglomerated product spread on the hearth onto the hearth with respect to the largest projected area ratio of the agglomerated product onto the hearth when the distance between the agglomerated products spread on the hearth is taken as 0 as well as the furnace temperature in the first half region in which the iron oxide in the agglomerated product is solid-reduced of the furnace is set to 1300° C. to 1450° C. and the furnace temperature in the second half region in which the reduced iron in the agglomerated product is carburized, melted and aggregated of the furnace is set to 1400° C. to 1550° C., and according to such a method, it is said that the productivity of granular metal iron can be improved as the base density and average diameter of the agglomerated product are controlled concurrently.

Indeed, it is also considered that the productivity of granular metal iron can be improved as the base density and average diameter of the agglomerated product are controlled as compared with the technique known before the technique disclosed in Patent Document 1 described above is proposed. However, this technique is merely a technique concerning the reactions which take place outside the agglomerated product, and the most important factor in the reduction reaction is the internal state of the agglomerate in which the reduction reaction takes place.

In other words, it can be said that, for example, it is possible to further enhance the reaction efficiency, also to uniformly conduct the reduction reaction, and to produce a high quality metal by controlling the reduction reaction in the agglomerate.

In addition, the yield at the time of production of the agglomerate decreases and this leads to an increase in cost as the diameter of the agglomerate is set to be in a regulated range as in the technique disclosed in Patent Document 1. Furthermore, the agglomerate cannot be laminated unless otherwise close-packed when the base density of the agglomerate is set to be in the range of 0.5 or more and 0.8 or less, and a significantly inefficient treatment step is performed and this leads to an increase in manufacturing cost.

Furthermore, there is a significant problem in terms of operation cost as well in the process using the so-called total melting method in which all the raw materials are melted and reduced as the technique disclosed in Patent Document 1. For example, a high temperature of 1500° C. or more is required in order to completely melt nickel oxide ore of a raw material, but large energy cost is required in order to achieve such a high temperature condition and repair cost is also required since the furnace to be used at such a high temperature is likely to be damaged. In addition, it is extremely inefficient to completely melt nickel oxide ore of a raw material since the nickel oxide ore contains nickel at only about 1% and all the components including components which are contained in a great amount but not required to be recovered are melted even though components other than iron corresponding to nickel are not required to be recovered.

For this reason, reduction methods by partial melting have been investigated in which only nickel required is preferentially reduced and iron contained in a much greater amount than nickel is only partially reduced. However, in such a partial reduction method (or also referred to as a nickel preferential reduction method), the reduction reaction is conducted while maintaining the raw materials in a semi-solid state in which the raw materials are not completely melted and thus it is not easy to control the reaction so that iron is only partially reduced while nickel is 100% completely reduced. For this reason, there is a problem that partial variations in the reduction in the raw material occur, the recovery rate of nickel decreases, and it is thus difficult to perform an efficient operation.

As described above, there have been a number of problems in order to produce a high quality metal while diminishing the manufacturing cost as well as to improve the productivity when mixing nickel oxide ore of a raw material, reducing the mixture, and thus producing a metal.

Patent Document 1: Japanese Unexamined Patent Application, Publication No. 2011-256414

DISCLOSURE OF THE INVENTION

Problems to be Solved by the Invention

The present invention has been proposed in view of such circumstances, and an object thereof is to provide a method by which a high quality metal can be inexpensively and efficiently produced as well as the recovery rate of metal is enhanced and thus the productivity is improved in a smelting method for producing a metal by reducing a mixture containing an oxide ore such as nickel oxide ore.

Means for Solving the Problems

The inventors of the present invention have conducted intensive investigations to solve the above-mentioned problems. As a result, it has been found out that a high quality metal having a high nickel grade can be efficiently produced by depositing a specific compound on the surface of a mixture obtained by mixing an oxide ore of a raw material with a reducing agent and subjecting the mixture to a reduction treatment in that state, whereby the present invention has been completed.

(1) A first aspect of the present invention is an oxide ore smelting method for obtaining a metal of a reduction product and slag by mixing an oxide ore and a carbonaceous reducing agent, heating the mixture obtained, and subjecting the mixture to a reduction treatment, in which the reduction treatment is performed in a state in which one or more kinds of surface deposits selected from a carbonaceous reducing agent, a metal oxide, and an oxidation inhibitor are deposited on a surface of the mixture.

(2) A second aspect of the present invention is the oxide ore smelting method according to the first aspect, in which the oxide ore is nickel oxide ore, at least the carbonaceous reducing agent is used as the surface deposit, and an amount of a carbonaceous reducing agent to be deposited on the surface of the mixture is set to a proportion of 0.1% by mass or more and 20.0% by mass or less when an amount of a carbonaceous reducing agent required for reducing nickel oxide and iron oxide contained in the mixture without excess or deficiency is taken as 100% by mass.

(3) A third aspect of the present invention is the oxide ore smelting method according to the second invention, in which an amount of a carbonaceous reducing agent present inside the mixture together with the oxide ore is set to a proportion of 40.0% by mass or less when an amount of a carbonaceous reducing agent required for reducing nickel oxide and iron oxide contained in the mixture without excess or deficiency is taken as 100% by mass.

(4) A fourth aspect of the present invention is the oxide ore smelting method according to the first aspect, in which at least the metal oxide is used as the surface deposit and the metal oxide is nickel oxide and/or iron oxide.

(5) A fifth aspect of the present invention is the oxide ore smelting method according to the fourth aspect, in which the oxide ore is nickel oxide ore and the metal oxide is deposited on the surface of the mixture so that an amount of a metal contained in the metal oxide is a proportion of 0.03% by mass or more and 8.0% by mass or less when a total amount of metals of nickel and iron contained in the mixture is taken as 100% by mass.

(6) A sixth aspect of the present invention is the oxide ore smelting method according to the fifth aspect, in which an amount of a carbonaceous reducing agent present inside the mixture together with the oxide ore is set to a proportion of 12.0% by mass or more and 35.0% by mass or less when an amount of a carbonaceous reducing agent required for reducing nickel oxide and iron oxide contained in the mixture without excess or deficiency is taken as 100% by mass.

(7) A seventh aspect of the present invention is the oxide ore smelting method according to the sixth aspect, in which the metal oxide is deposited on the surface of the mixture so that an amount of a metal contained in the metal oxide is a proportion of 0.1% by mass or more and 2.0% by mass or less when the total amount of metals of nickel and iron contained in the mixture is taken as 100% by mass.

(8) An eighth aspect of the present invention is the oxide ore smelting method according to the first aspect, in which at least the oxidation inhibitor is used as the surface deposit and the oxidation inhibitor is an oxide mixture having an oxide content of 90% by mass or more.

(9) A ninth aspect of the present invention is the oxide ore smelting method according to the first aspect, in which at least the oxidation inhibitor is used as the surface deposit and the oxidation inhibitor is an oxidation inhibiting mixture containing an oxide mixture having an oxide content of 90% by mass or more and a carbonaceous reductant.

(10) A tenth aspect of the present invention is the oxide ore smelting method according to the ninth aspect, in which the carbonaceous reductant contained in the oxidation inhibiting mixture is coal and/or coke.

(11) An eleventh aspect of the present invention is the oxide ore smelting method according to any one of the eighth to tenth aspects, in which the surface deposit is put on an upper surface of the mixture and the reduction treatment is performed.

(12) A twelfth aspect of the present invention is the oxide ore smelting method according to any one of the eighth to tenth aspects, in which the mixture is surrounded with the surface deposit and the reduction treatment is performed.

(13) A thirteenth aspect of the present invention is the oxide ore smelting method according to any one of the eighth to twelfth aspects, in which ash of the carbonaceous reducing agent is at least partially used as the oxidation inhibitor.

(14) A fourteenth aspect of the present invention is the oxide ore smelting method according to any one of the eighth to thirteenth aspects, in which one or more kinds selected from coal ash, charcoal ash, and bamboo charcoal ash are at least partially used as the oxidation inhibitor.

(15) A fifteenth aspect of the present invention is the oxide ore smelting method according to any one of the eighth to twelfth aspects, in which one or more kinds selected from alumina, alumina cement, magnesia, magnesia cement, zirconia, zirconia cement and mullite are at least partially used as the oxidation inhibitor.

(16) A sixteenth aspect of the present invention is the oxide ore smelting method according to any one of the first to fifteenth aspects, in which a treatment is performed in a state in which the mixture is charged into a reducing furnace having a carbonaceous reducing agent spread on a hearth in advance and the mixture is placed on the carbonaceous reducing agent in the reduction treatment.

(17) A seventeenth aspect of the present invention is the oxide ore smelting method according to any one of the first to sixteenth aspects, in which a reducing temperature in the reduction treatment is set to 1200° C. or more and 1450° C. or less.

Effects of the Invention

According to the present invention, it is possible to inexpensively and efficiently produce a high quality metal as well as to enhance the recovery rate of metal and thus to improve the productivity in a smelting method for producing a metal by reducing a mixture containing an oxide ore such as nickel oxide ore.

PREFERRED MODE FOR CARRYING OUT THE INVENTION

Figure 1:
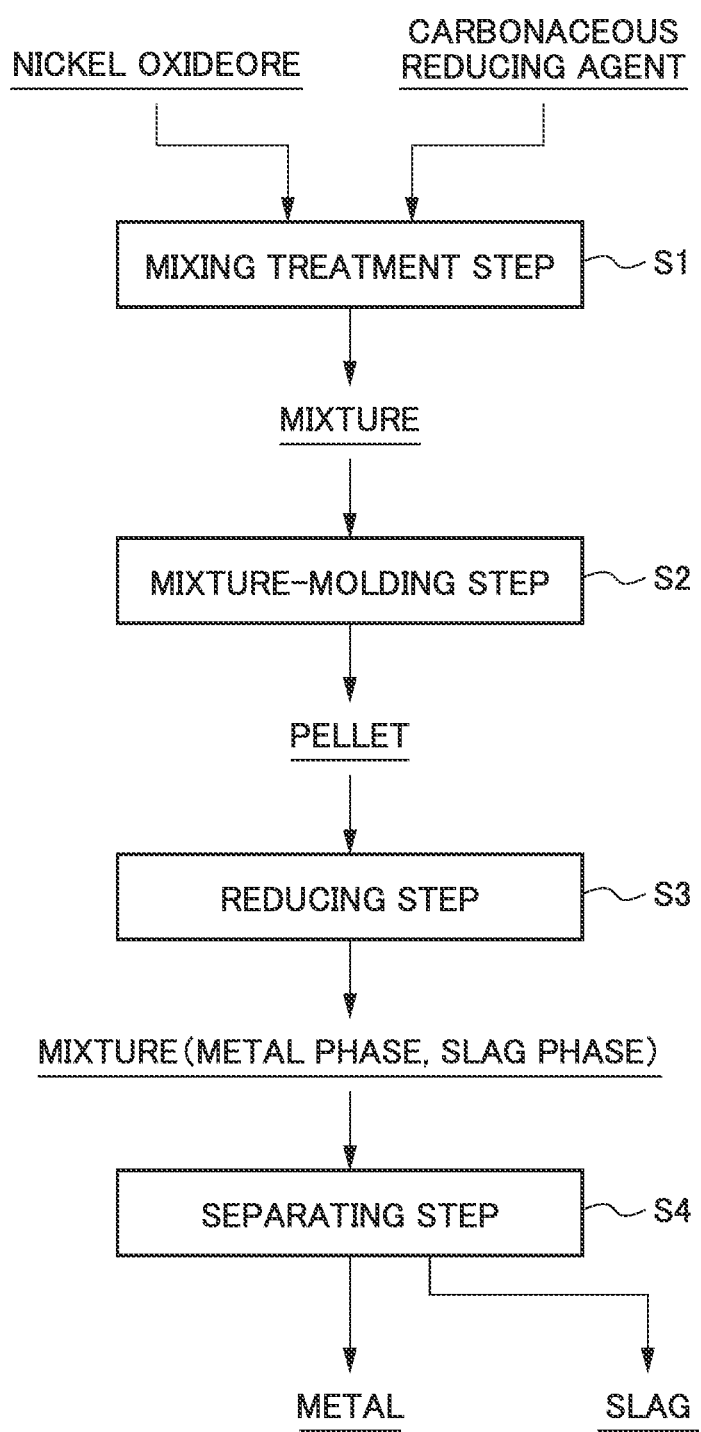
FIG. 1 is a flow chart illustrating an example of the flow of a method for smelting nickel oxide ore.

Hereinafter, specific embodiments of the present invention (hereinafter referred to as the "present embodiments") will be described in detail. It should be noted that the present invention is not limited to the following embodiments, and various modifications can be made without changing the gist of the present invention. In addition, in the present specification, the notation "X to Y" (X and Y are arbitrary numerical values) means "X or more and Y or less".

1. Overview of Present Invention

The oxide ore smelting method according to the present invention is a method for producing a metal, which is a reduction product, by using an oxide ore as a raw material, mixing the oxide ore with a carbonaceous reducing agent to obtain a mixture and subjecting the mixture obtained to a reduction treatment at a high temperature. Examples thereof may include a method for producing ferronickel, which is an alloy of iron and nickel, by using nickel oxide ore containing nickel oxide, iron oxide and the like of an oxide ore as a raw material, mixing the nickel oxide ore with a carbonaceous reducing agent, preferentially reducing nickel contained in the mixture at a high temperature, and partially reducing iron.

Specifically, the oxide ore smelting method according to the present invention is characterized in that the reduction treatment is performed in a state in which one or more kinds of compounds (hereinafter also referred to as the "surface deposits") selected from a carbonaceous reducing agent, a metal oxide, and an oxidation inhibitor are deposited on the surface of the mixture in a method for obtaining a metal, which is a reduction product, and slag by mixing an oxide ore with a carbonaceous reducing agent, heating the mixture obtained, and subjecting the mixture to a reduction treatment.

According to such a smelting method, it is possible to enhance the metallized rate of nickel or the like and to produce a high quality metal having a high grade of metal such as nickel by performing a reduction treatment in a state in which a surface deposit is deposited on the surface of a mixture containing an oxide ore and a carbonaceous reducing agent. In addition, it is possible to inexpensively and efficiently perform the treatment since the method is an extremely simple method in which a surface deposit is deposited on the surface of a mixture obtained by mixing at least an oxide ore with a carbonaceous reducing agent.

Hereinafter, as a specific embodiment of the present invention (hereinafter referred to as the "present embodiment"), a method for smelting nickel oxide ore will be described as an example. As described above, the nickel oxide ore, which is a raw material for smelting, contains at least nickel oxide (NiO) and iron oxide ($Fe_2O_3$) and an iron-nickel alloy (ferronickel) can be produced as a metal by performing a reduction treatment using the nickel oxide ore as a raw material for smelting.

Incidentally, in the present invention, the oxide ore is not limited to nickel oxide ore and the smelting method is also not limited to a method for producing ferronickel from nickel oxide ore containing nickel oxide and the like.

2. Method for Smelting Nickel Oxide Ore

The method for smelting nickel oxide ore according to the present embodiment is a method for generating ferronickel, which is a metal, as a reduction product and slag by mixing nickel oxide ore with a carbonaceous reducing agent to obtain a mixture and subjecting the mixture to a reduction treatment. Incidentally, ferronickel, which is a metal, can be recovered from a mixture which contains metal and slag and is obtained through a reduction treatment by separating the metal.

FIG. 1 is a flow chart illustrating an example of the flow of a method for smelting nickel oxide ore. As illustrated in FIG. 1, this smelting method includes a mixing treatment step S1 for mixing raw materials including nickel oxide ore, a mixture-molding step S2 for molding the mixture obtained into a predetermined shape, a reducing step S3 for reducing and heating the mixture (pellet) molded at a predetermined reducing temperature, and a separating step S4 for separating the metal and slag generated in the reducing step S3 from each other and recovering the metal.

<2-1. Mixing Treatment Step>

The mixing treatment step S1 is a step for mixing raw material powders including nickel oxide ore to obtain a mixture. Specifically, in the mixing treatment step S1, a carbonaceous reducing agent is added to and mixed with nickel oxide ore, which is a raw material ore, and powders of iron ore, a flux component, a binder and the like having a particle diameter of, for example, about from 0.1 mm to 0.8 mm as additives of arbitrary components are added to and mixed with the mixture, thereby obtaining a mixture. Incidentally, the mixing treatment can be performed by using a mixing machine or the like.

The nickel oxide ore, which is a raw material ore, is not particularly limited, but limonite ore, saprolite ore and the like can be used. Incidentally, the nickel oxide ore contains at least nickel oxide (NiO) and iron oxide ($Fe_2O_3$).

The carbonaceous reducing agent is not particularly limited, but examples thereof may include a coal powder and a coke powder. Incidentally, it is preferable that this carbonaceous reducing agent has a size equivalent to the particle size and particle size distribution of the nickel oxide ore, which is a raw material ore, since these materials are likely to be uniformly mixed and the reduction reaction is also likely to uniformly proceed.

The amount of the carbonaceous reducing agent mixed can be adjusted so that the proportion of carbon amount is preferably 5% by mass or more and 60% by mass or less and more preferably 10% by mass or more and 40% by mass or less when the total value (also conveniently referred to as the "total value of chemical equivalents") of a chemical equivalent required for reducing the entire amount of nickel oxide constituting the nickel oxide ore into nickel metal and a chemical equivalent required for reducing iron oxide (ferric oxide) into iron metal is taken as 100% by mass. The reduction of nickel can be efficiently advanced and the productivity is improved by setting the amount of the carbonaceous reducing agent mixed to a proportion to be 5% by mass or more with respect to 100% by mass of the total value of chemical equivalents in this manner. On the other hand, it is possible to suppress the amount of iron reduced, to prevent a decrease in nickel grade, and to produce high quality ferronickel by setting the proportion to 60% by mass or less with respect to 100% by mass of the total value of chemical equivalents. It is preferable that the amount of the carbonaceous reducing agent mixed is set to a proportion of carbon amount to be 5% by mass or more and 60% by mass or less with respect to 100% by mass of the total value of chemical equivalents in this manner since it is possible to uniformly generate a shell (metal shell) generated from a metal component on the surface of the mixture, to improve the productivity, and also to obtain high quality ferronickel having a high nickel grade.

In addition, in a case in which at least a carbonaceous reducing agent is deposited on the surface of a mixture obtained by mixing nickel oxide ore with a carbonaceous reducing agent as a surface deposit and the reduction treatment is performed in this state in the reducing step S3 of the subsequent step, it is preferable that the amount of the carbonaceous reducing agent present inside the mixture is set to a proportion of 40% by mass or less when the total value of chemical equivalents described above is taken as 100% by mass. Incidentally, the carbonaceous reducing agent to be deposited on the surface of the mixture to be subjected to the reduction treatment is also referred to as the "carbonaceous reducing agent for surface deposition" for convenience in order to distinguish this carbonaceous reducing agent from the carbonaceous reducing agent which constitutes the mixture together with the nickel oxide ore and is present inside the mixture.

In a case in which the carbonaceous reducing agent for surface deposition is deposited on the surface of the mixture and the reduction treatment is performed in this manner, it is possible to uniformly form a metal shell on the surface of the mixture (pellet) by the reduction treatment as the amount (mixed amount) of the carbonaceous reducing agent to be contained in the mixture is adjusted so as to be a proportion to be 40% by mass or less with respect to 100% by mass of the total value of chemical equivalents although it will be described in detail later. In addition, it is possible to suppress an increase in the amount of metal iron due to excessive metalation of iron by the reduction reaction and to prevent a decrease in the nickel grade in ferronickel.

In addition, in a case in which at least a metal oxide is deposited on the surface of a mixture obtained by mixing nickel oxide ore with a carbonaceous reducing agent as a surface deposit and the reduction treatment is performed in this state in the reducing step S3 of the subsequent step, it is preferable that the amount of the carbonaceous reducing agent present inside the mixture is set to a proportion of 12% by mass or more and 35% by mass or less when the total value of chemical equivalents described above is taken as 100% by mass.

In a case in which a metal oxide is deposited on the surface of the mixture and the reduction treatment is performed in this manner, it is possible to uniformly form a metal shell on the surface of the mixture (pellet) by the reduction treatment as the amount (mixed amount) of the carbonaceous reducing agent to be contained in the mixture is adjusted so as to be a proportion to be 12% by mass or more and 35% by mass or less with respect to 100% by mass of the total value of chemical equivalents although it will be described in detail later. In addition, it is more preferable that the amount (mixed amount) of the carbonaceous reducing agent to be contained in the mixture is adjusted so as to be a proportion to be 13% by mass or more and 30% by mass or less with respect to 100% by mass of the total value of chemical equivalents.

In addition, as the iron ore, which is an additive of an arbitrary component, for example, iron ore having an iron grade of about 50% or more, hematite to be obtained by hydrometallurgy of nickel oxide ore, and the like can be used.

In addition, examples of the flux component may include calcium oxide, calcium hydroxide, calcium carbonate, and silicon dioxide. In addition, examples of the binder may include bentonite, a polysaccharide, a resin, water glass, and dehydrated cake.

In the mixing treatment step S1, a mixture is obtained by uniformly mixing raw material powders including nickel oxide ore as described above. Upon this mixing, kneading may be performed at the same time as mixing or after mixing in order to enhance the mixing property. Specifically, kneading can be performed by using, for example, a twin-screw kneader and the like, and it is possible to improve adhesive property of the respective particles and to decrease voids as well as to uniformly mix the materials by applying a shear force to the mixture and untangling the aggregation of the carbonaceous reducing agent, raw material powders and the like by kneading the mixture. It is possible to uniformly conduct the reaction and to shorten the reaction time of the reduction reaction as well as the reduction reaction is likely to take place by this. In addition, it is possible to diminish variations in the quality. Moreover, it is possible to perform a highly productive treatment and to produce high quality ferronickel as a result.

In addition, after kneading, the mixture may be extruded by using an extruding machine. It is possible to obtain a still higher kneading effect by extruding the mixture by using an extruding machine in this manner.

Incidentally, an example of the composition (% by weight) of a part of raw material powders to be mixed in the mixing treatment step S1 are presented in the following Table 1, but the composition of the raw material powders is not limited thereto.

TABLE 1

| Raw material powder [% by weight] | Ni | $Fe_2O_3$ | C |
|---|---|---|---|
| Nickel oxide ore | 1~2 | 50~60 | — |
| Carbonaceous reducing agent | — | — | ≈85 |
| Iron ore | — | 80~95 | — |

<2-2. Mixture-Molding Step>

The mixture-molding step S2 is a step for molding the mixture obtained in the mixing treatment step S1. Specifically, the mixture obtained by mixing the raw material powders is molded into a lump (lumped product, hereinafter also referred to as the "pellet") having a certain size or larger. Hence, the mixture-molding step S2 can also be said to be a pellet producing step.

The molding method is not particularly limited, but moisture is added to the mixture in an amount required for forming the mixture into a lump product and the mixture is molded into a pellet having a predetermined shape by using, for example, a lump product manufacturing apparatus (a tumbling granulator, a compression molding machine, an extrusion molding machine, or the like, or also referred to as a pelletizer).

The shape of the lumped product (pellet) to be obtained by molding the mixture can be, for example, a rectangular parallelepiped shape, a cylindrical shape, or a spherical shape. It is possible to easily mold the mixture and to diminish the cost required for molding by adopting such a shape. In addition, it is possible to suppress the generation of defective products and to make the quality of the pellets to be obtained uniform since the shape described above is a simple shape but is not complicated.

In addition, as the shape of the lumped product, it is preferable that the pellets can be treated in a state of being laminated in the treatment in the reducing step of the next step, and it is easy to place the pellets in the reducing furnace by laminating and to increase the throughput to be subjected to the reduction treatment when the pellet has a rectangular parallelepiped shape, a cylindrical shape, a spherical shape or the like in this regard as well. In addition, it is possible to increase the throughput at the time of reduction without enlarging one pellet by subjecting the pellets to the reduction treatment by laminating in this manner, and thus it is easy to handle the pellets, the pellets does not collapse and the like at the time of moving and the like, and the generation of defects and the like can be suppressed.

The volume of the mixture (pellet) molded is not particularly limited, but it is preferably 8000 $mm^3$ or more. The molding cost increases and it takes time and labor to charge the pellets into the reducing furnace when the volume of the pellets is too small. In addition, the proportion of the surface area with respect to the entire pellets increases when the volume of the pellets is small, and thus a difference in the degree of reduction between the surface and inside of the pellet is likely to occur, there is a possibility that it is difficult to uniformly advance the reduction, and it is difficult to produce high quality ferronickel. On the other hand, it is possible to effectively diminish the molding cost and it is easy to handle the pellets when the volume of the pellets composed of the mixture is 8000 $mm^3$ or more. In addition, it is possible to stably obtain high quality ferronickel.

After the mixture is molded, the mixture may be subjected to a drying treatment. There is a case in which a certain amount of moisture may be contained in the mixture, and there is concern that the mixture is broken into fragments when the internal moisture evaporates and expands at a time by a sharp increase in the temperature at the time of the reduction treatment. It is possible to provide a step for subjecting the mixture molded to a drying treatment from the viewpoint of preventing such expansion.

Specifically, in the drying treatment, for example, a treatment can be performed so that the pellet has a solid content of about 70% by weight and a water content of about 30% by weight. For example, the pellets are dried by blowing hot air at from 150° C. to 400° C. thereto.

Incidentally, fissures and breaks may be present on the mixture before and after being subjected to the drying treatment in a case in which the mixture is a relatively large pellet. It is not a significant problem that the surface area increases by breaks and the like since the influence thereof is slight in a case in which the lump is large. For this reason, there is particularly no problem even when breaks and the like are present on the molded pellets to be subjected to the reduction treatment.

An example of the composition (parts by weight) of solid components in the mixture after being subjected to a drying treatment is presented in the following Table 2. Incidentally, the composition of the mixture is not limited to this.

TABLE 2

| Composition of solid component in mixture after being dried [Parts by weight] | | | | | | | |
|---|---|---|---|---|---|---|---|
| Ni | $Fe_2O_3$ | $SiO_2$ | CaO | $Al_2O_3$ | MgO | Binder | Others |
| 0.5~1.5 | 50~60 | 8~15 | 4~8 | 1~6 | 2~7 | About 1 | Remainder |

<2-3. Reducing Step>

In the reducing step S3, the mixture molded through the mixture-molding step S2 is charged into a reducing furnace and reduced and heated at a predetermined reducing temperature. The smelting reaction (reduction reaction) proceeds and a metal, which is a reduction product, and slag are generated by the reduction and heat treatment in this reducing step S3.

In the reducing step S3, the slag in the mixture melts to form a liquid phase, but the metal and the slag which have been already separately generated by the reduction treatment do not mix with each other but form a mixture in which the metal and the slag are present together as separate phases of a metal solid phase and a slag solid phase by subsequent cooling. The volume of this mixture is contracted to a volume to be about from 50% to 60% of the volume of the mixture charged.

(Surface Deposit)

Meanwhile, the present embodiment is characterized in that the treatment is performed in a state in which one or more kinds of materials selected from a carbonaceous reducing agent (carbonaceous reducing agent for surface deposition), a metal oxide, and an oxidation inhibitor are deposited on the surface of the mixture when subjecting the mixture (pellet) to the reduction treatment in the reducing furnace. Here, one or more kinds of materials selected from a carbonaceous reducing agent for surface deposition, a metal oxide, and an oxidation inhibitor to be deposited on the surface of the mixture are defined as "surface deposits".

Incidentally, each of the surface deposits will be specifically described below, but it is not limited to single use of each material but it is also possible to concurrently use plural kinds of materials as the surface deposit.

[Application of Carbonaceous Reducing Agent for Surface Deposition]

Specifically, a layer of a carbonaceous reducing agent is formed on the surface of the mixture in a case in which a carbonaceous reducing agent for surface deposition is used as the surface deposit, and it is possible to effectively form a shell (metal shell) generated from a metal component on the surface by performing the reduction treatment in this state. This makes it possible to prevent the carbonaceous reducing agent (reducing agent component) present inside the mixture from leaking from the mixture and to stably conduct the reduction reaction. In addition, it is possible to suppress the collapse at the time of the reduction and heat treatment since the strength of the mixture subjected to the reduction treatment is maintained. For these reasons, it is possible to efficiently produce high quality ferronickel without causing divergence or variations in the composition.

As the carbonaceous reducing agent for surface deposition, a coal powder, a coke powder and the like can be used in the same manner as the carbonaceous reducing agent present inside the mixture. In addition, the size and shape of the carbonaceous reducing agent for surface deposition are also not particularly limited, and it is preferable to use one having a size of about from several micrometers to several hundreds of micrometers, for example, in a case in which the mixture is a spherical one having a diameter of from several millimeters to several tens of millimeters.

In the case of using a carbonaceous reducing agent for surface deposition, it is preferable that the amount of the carbonaceous reducing agent for surface deposition (the amount deposited on the mixture) is set to a proportion of 0.1% by mass or more and 20.0% by mass or less when the total value of chemical equivalents of the carbonaceous reducing agent required for reducing nickel oxide and iron oxide contained in the mixture to be subjected to the reduction treatment without excess or deficiency is taken as 100% by mass. In addition, the amount is more preferably set to a proportion of 1.0% by mass or more and 15.0% by mass or less and still more preferably set to a proportion of 3.0% by mass or more and 10.0% by mass or less.

There is a possibility that the effect to be obtained by depositing the carbonaceous reducing agent on the surface is not sufficiently obtained and the reaction for generating a metal shell does not efficiently proceed when the amount of the carbonaceous reducing agent for surface deposition deposited is a proportion to be less than 0.1% by mass with respect to 100% by mass of the total value of chemical equivalents described above. On the other hand, the reduction of iron oxide in the metal shell formed proceeds too much and there is a possibility that the grade of nickel in ferronickel to be obtained decreases when the deposited amount is a proportion to be more than 20.0% by mass with respect to 100% by mass of the total value of chemical equivalents. In addition, it is disadvantageous in terms of cost that the deposited amount exceeds 20.0% by mass since the amount of the carbonaceous reducing agent for surface deposition is too excessive.

The method for depositing the carbonaceous reducing agent for surface deposition on the surface of the mixture is not particularly limited, but it is preferable to coat the carbonaceous reducing agent for surface deposition on the surface of the mixture so as to be uniformly present on the surface of the mixture. For example, the carbonaceous reducing agent for surface deposition is deposited and coated on the mixture while rolling the mixture on the carbonaceous reducing agent for surface deposition spread on a flat sheet. Alternatively, the carbonaceous reducing agent for surface deposition may be deposited on the mixture by being sprinkled from above the mixture.

Excess moisture at, for example, about 50% by weight is contained in the pellet and the pellet is in a sticky state when the mixture is lumped into a pellet. Hence, it is possible to effectively deposit the carbonaceous reducing agent for surface deposition on the surface by rolling the mixture (pellet) on the carbonaceous reducing agent for surface deposition or sprinkling the carbonaceous reducing agent for surface deposition from above. The same applies to a case in which a metal oxide is applied to be described later.

A pellet can be produced, charged into a reducing furnace, and subjected to a reduction treatment by depositing a carbonaceous reducing agent for surface deposition on the surface of the mixture in this manner.

Figure 2:
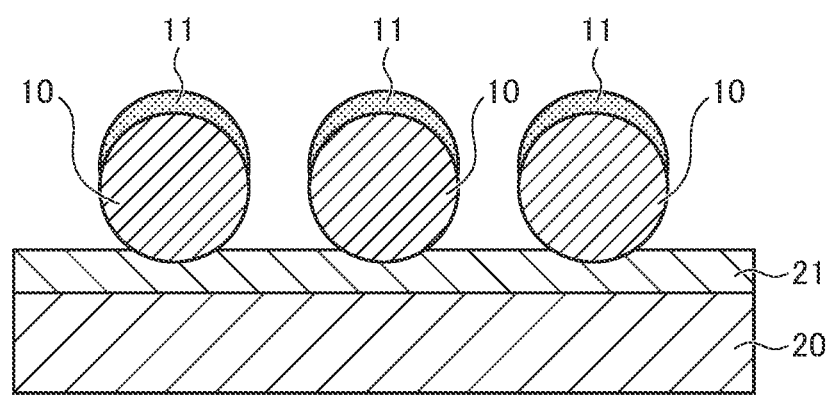
FIG. 2 is a view schematically illustrating a state when a surface deposit (particularly, an oxidation inhibitor) is put and deposited on the upper surface (surface of upper part) of a mixture to be subjected to a reduction treatment.
Figure 3:
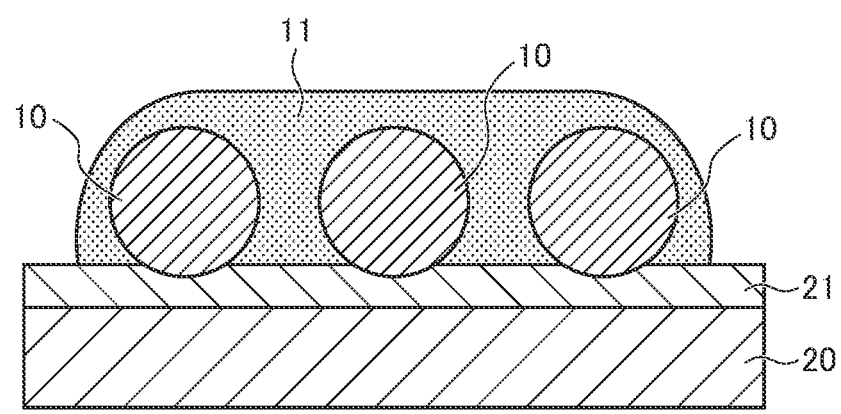
FIG. 3 is a view schematically illustrating a state when a surface deposit (particularly, an oxidation inhibitor) is deposited so as to surround a mixture to be subjected to a reduction treatment.

In addition, the carbonaceous reducing agent for surface deposition may be deposited so as to be put on a part of the surface of the mixture, particularly on the surface of the upper part, for example, as illustrated in FIG. 2 to be described in detail later. Furthermore, the carbonaceous reducing agent for surface deposition may be deposited so as to surround the mixture as illustrated in FIG. 3 to be described later. Incidentally, in this case, the carbonaceous reducing agent for surface deposition may be put on the upper surface of the mixture (pellet) inside the reducing furnace or a lump of the carbonaceous reducing agent for surface deposition may be prepared in the reducing furnace in advance and the mixture may be buried therein.

[Application of Metal Oxide]

In addition, a layer of a metal oxide is formed on the surface of the mixture in a case in which a metal oxide is used as the surface deposit as well, and it is possible to effectively form a metal shell on the surface by performing the reduction treatment in this state. This makes it possible to prevent the carbonaceous reducing agent (reducing agent component) present inside the mixture from leaking from the mixture and to stably conduct the reduction reaction. In addition, it is possible to suppress the collapse at the time of the reduction and heat treatment since the strength of the mixture subjected to the reduction treatment is maintained. For these reasons, it is possible to efficiently produce high quality ferronickel without causing divergence or variations in the composition.

The metal oxide is not particularly limited, but it is preferably one or more kinds selected from nickel oxide and iron oxide. In addition, the size and shape of the metal oxide are also not particularly limited, and it is preferable to use one having a size of about from several micrometers to several hundreds of micrometers, for example, in a case in which the mixture is a spherical one having a diameter of from several millimeters to several tens of millimeters. Incidentally, it is difficult to uniformly deposit the metal oxide on the surface of the mixture when the particles of the metal oxide are too large, and the particles of the metal oxide soar at the time of the deposition operation to increase the amount of the metal oxide lost and the particles enter the apparatus to cause malfunction and lead to an increase in the cost for cleaning when the particles are too small.

In the case of using a metal oxide, the amount of the metal oxide (the amount deposited on the mixture) is set so that the amount of metal contained in the metal oxide is preferably a proportion of 0.03% by mass or more and 8.0% by mass or less and more preferably a proportion of 0.05% by mass or more and 5.0% by mass or less when the total amount of metals of nickel and iron contained in the mixture to be subjected to the reduction treatment is taken as 100% by mass.

There is a possibility that the effect to be obtained by depositing the metal oxide on the surface is not sufficiently obtained and the reaction for generating a metal shell does not efficiently proceed when the amount of the metal oxide deposited is a proportion to be less than 0.03% by mass with respect to 100% by mass of the total amount of metals of nickel and iron contained in the mixture. On the other hand, the reduction of iron oxide in the metal shell formed proceeds too much and there is a possibility that the grade of nickel in ferronickel to be obtained decreases when the deposited amount is a proportion exceeding 5.0% by mass.

In addition, it is preferable that the amount of the metal oxide to be deposited on the mixture is set so that the amount of metal contained in the metal oxide is a proportion to be 0.1% by mass or more and 2.0% by mass or less with respect to 100% by mass of the total amount of metals of nickel and iron contained in the mixture in a case in which the amount of the carbonaceous reducing agent mixed, namely, the amount of the carbonaceous reducing agent to be present inside the mixture is set to a proportion in a range of 12.0% by mass or more and 35.0% by mass or less with respect to 100% by mass of the total value of chemical equivalents described above as described above. By this, the reduction reaction more efficiently proceeds and the metal shell is likely to be uniformly formed.

The method for depositing the metal oxide on the surface of the mixture is not particularly limited, but it is preferable to coat the metal oxide on the surface of the mixture so as to be uniformly present on the surface of the mixture. For example, the metal oxide is deposited and coated on the mixture while rolling the mixture on the metal oxide spread on a flat sheet. Alternatively, the metal oxide may be deposited on the mixture by being sprinkled from above the mixture.

A pellet can be produced, charged into a reducing furnace, and subjected to a reduction treatment by depositing a metal oxide on the surface of the mixture in this manner.

In addition, the metal oxide may be deposited so as to be put on a part of the surface of the mixture, particularly on the surface of the upper part, for example, as illustrated in FIG. 2 to be described in detail later. Furthermore, the metal oxide may be deposited so as to surround the mixture as illustrated in FIG. 3 to be described later. Incidentally, in this case, the metal oxide may be put on the upper surface of the mixture (pellet) inside the reducing furnace or a lump of the metal oxide may be prepared in the reducing furnace in advance and the mixture may be buried therein.

[Application of Oxidation Inhibitor]

In addition, in the case of using an oxidation inhibitor as the surface deposit, it is possible to effectively suppress the oxidation inside the mixture, to improve the metallized rate of nickel, and to efficiently obtain high quality ferronickel having a high nickel grade by performing the reduction treatment in a state in which the oxidation inhibitor is deposited on the surface of the mixture.

More specifically, usually oxygen is contained at several percent, for example, in a heavy oil combustion atmosphere. For this reason, the mixture reduced with effort is oxidized to be an oxide again in some cases. When the oxidation of the mixture proceeds in this manner, the rate of reduction of the raw material ore decreases, and the oxidation of nickel, which is more easily oxidized than iron, proceeds, and the grade of nickel in ferronickel to be obtained decreases.

In contrast, it is possible to prevent the invasion of oxygen contained in the atmosphere into the mixture by reducing the mixture in a state in which an oxidation inhibitor is deposited on the surface of the mixture. In particular, oxidation proceeds from the surface of the mixture, and thus it is possible to effectively prevent the oxidation and to suppress a decrease in the rate of reduction and a decrease in the grade of nickel in ferronickel based on the decrease in the rate of reduction as an oxidation inhibitor is previously deposited on the surface.

As the oxidation inhibitor, for example, an oxide mixture having a composition in which the content of oxide is 90% by mass or more can be used. It is possible to effectively prevent the invasion of oxygen into the mixture and to more efficiently suppress the oxidation by using an oxide mixture containing an oxide at a high proportion as the oxidation inhibitor in this manner.

In addition, it is also possible to use a mixture obtained by mixing an oxide mixture having a composition in which the content of oxide is 90% by mass or more with a carbonaceous reducing agent as the oxidation inhibitor. Incidentally, this mixture is referred to as an "oxidation inhibiting mixture". The carbonaceous reducing agent to be contained in the oxidation inhibiting mixture is preferably at least one or more of coal or coke. At this time, it is preferable that the oxide mixture:carbonaceous reducing agent=about 9:1 as the weight ratio, that is, the content of the carbonaceous reducing agent is about 10% in the oxidation inhibiting mixture.

It is possible to positively remove invaded oxygen as well as to prevent invasion of oxygen into the mixture by using an oxidation inhibiting mixture containing an oxide at a high proportion and further coal and coke as the oxidation inhibitor in this manner. In addition, an action that coal and coke react with oxygen and oxidation of the mixture is suppressed is exerted by the presence of coal and coke even when oxygen is present around the mixture. Moreover, the mixture can be reduced again by the presence of coal and coke on the surface of the mixture even in a case in which oxidation of the mixture has proceeded.

In addition, as the oxidation inhibitor, it is preferable to at least partially use ash to be obtained from the carbonaceous reducing agent constituting the mixture together with nickel oxide ore of a raw material. In addition, as the oxidation inhibitor, it is preferable to at least partially use one or more kinds selected from coal ash, charcoal ash, and bamboo charcoal ash. These are mainly oxides (an oxide mixture having an oxide content of 90% by mass), and oxidation can be effectively suppressed as these are present around the mixture to be subjected to the reduction treatment.

In addition, as the oxidation inhibitor, it is also possible to at least partially use one or more kinds selected from alumina, alumina cement, magnesia, magnesia cement, zirconia, zirconia cement, and mullite. These are oxide mixtures having an oxide content of 90% by mass, and the oxidation can be effectively suppressed as these are present around the mixture to be subjected to the reduction treatment. In addition, these have an action of reducing the mixture again even in a case in which oxidation of the mixture has proceeded.

Here, as the form of the oxidation inhibitor deposited on the surface of the mixture, a state in which the oxidation inhibitor, which is a surface deposit 11, is put on the upper surface (surface of upper part) of a mixture 10 is adopted, for example, as an example is schematically illustrated in FIG. 2. The oxidation of the mixture proceeds from the surface as described above, and thus it is possible to effectively suppress oxidation of the mixture 10 caused by the atmospheric component by putting the surface deposit on the "surface" of the mixture 10 and allowing the surface deposit to be present in a state of being in contact with the surface in this manner. Incidentally, in FIG. 2, a reference numeral 20 denotes a hearth of the reducing furnace, and a reference numeral 21 denotes a hearth covering material (a carbonaceous reducing agent such as coal or a hearth covering material such as alumina, zirconia, or magnesia) laid on the hearth (the same applies to FIG. 3).

The oxidation of the mixture can be effectively suppressed as long as the oxidation inhibitor is in a state of being partially present at a location to which the combustion gas and the like directly hits since it is only required to prevent the contact between oxygen and a metal on the surface of the mixture. Particularly, in a case in which the reducing furnace is heated by using a burner, the burner is often installed at the upper part of the target of treatment as a suitable location for the facility, and thus a gas containing oxygen in a relatively great amount is supplied through the upper part. For this reason, it is preferable that the oxidation inhibitor is deposited so as to be put on the surface of the mixture, particularly on the upper surface thereof, as illustrated in FIG. 2 since an efficient oxidation inhibiting effect can be exerted.

In addition, as the form of the oxidation inhibitor deposited on the surface of the mixture, it is possible to adopt a state in which the mixture 10 is wrapped and surrounded with the oxidation inhibitor, which is the surface deposit 11, so that the surface of the mixture 10 is not exposed, for example, as an example is schematically illustrated in FIG. 3. Incidentally, it can also be expressed as the mixture 10 is "buried" inside the lump of the surface deposit 11. It is possible to construct a wall for so-called oxidation prevention, more effectively to prevent invasion of oxygen into the mixture 10, and to further suppress the oxidation as the mixture 10 is buried in and surrounded with the surface deposit 11 and the reduction treatment is performed in this manner.

Incidentally, the mode of deposition of the oxidation inhibitor is not limited to those illustrated in FIG. 2 and FIG. 3, and any mode may be adopted as long as invasion of oxygen into the mixture can be prevented and the oxidation can be efficiently suppressed, and the method may be selected depending on the situation.

(Reduction Treatment)

The reducing furnace to be used for the reduction and heat treatment is not particularly limited, but it is preferable to use, for example, a movable hearth furnace. By using a movable hearth furnace as a reducing furnace, the reduction reaction continuously proceeds and it is possible to complete the reaction in one facility and to more accurately control the treatment temperature as compared to a case of performing the treatments in the respective steps by using separate furnaces.

In addition, it is possible to decrease loss of heat (heat loss) between the respective treatments and to more efficiently perform the operation by using a movable hearth furnace. In other words, in the case of performing the reactions by using separate furnaces, the temperature temporarily drops and heat loss occurs as the container, in which the mixture is enclosed, is exposed to the outside air or a state close thereto when being moved from one furnace to another furnace, and a change in the reaction atmosphere is also caused. As a result, the reaction does not start immediately when the container is recharged into the furnace in order to perform the next treatment.

In contrast, by performing the respective treatments in one facility by using a movable hearth furnace, the furnace atmosphere can be accurately controlled as well as the heat loss diminishes, and it is thus possible to more effectively advance the reaction. These make it possible to more effectively obtain high quality ferronickel having a high nickel grade.

Specifically, as the movable hearth furnace, it is possible to use, for example, a rotary hearth furnace which has a circular shape and is partitioned into a plurality of treatment regions. In the rotary hearth furnace, each treatment is performed in each region while the furnace rotates in a predetermined direction. In this rotary hearth furnace, the treatment time in each region can be adjusted by controlling the time (moving time, rotating time) when the mixture passes through each region, and the mixture is smelted every time the rotary hearth furnace rotates one time. In addition, the movable hearth furnace may be a roller hearth kiln or the like.

In the reduction treatment using a reducing furnace, so-called partial reduction is performed in which nickel oxide contained in the nickel oxide ore, which is a raw material ore, is preferentially reduced as completely as possible but iron oxide contained in the nickel oxide ore is only partially reduced so as to obtain the intended ferronickel having a high nickel grade.

The reducing temperature is not particularly limited, but it is set to be preferably in a range of 1200° C. or more and 1450° C. or less and more preferably in a range of 1300° C. or more and 1400° C. or less. By performing the reduction in such a temperature range, it is possible to uniformly conduct the reduction reaction and to generate a metal (ferronickel) having diminished variations in quality. In addition, it is possible to conduct the desired reduction reaction in a relatively short time by performing the reduction at a reducing temperature in a more preferable range of 1300° C. or more and 1400° C. or less.

Incidentally, in the reduction treatment, the internal temperature of the reducing furnace is raised by using a burner or the like until the reducing temperature reaches the range described above and the temperature after being raised is maintained.

In addition, in the reducing step S3, a carbonaceous reducing agent (hereinafter also referred to as the "hearth carbonaceous reducing agent") may be spread on the hearth of the reducing furnace in advance and the mixture may be placed on the spread hearth carbonaceous reducing agent and subjected to the treatment when charging the mixture into the reducing furnace. In addition, a hearth covering material such as alumina, zirconia, or magnesia may be laid on the hearth and the mixture may also be placed thereon and subjected to the treatment. Incidentally, as the hearth covering material, one containing an oxide as the main component can be used.

It is possible to suppress the direct reaction between the hearth and the mixture, to prevent fusion of the mixture to the hearth, and to extend the life span of the hearth by laying a carbonaceous reducing agent, a hearth covering material and the like on the hearth of the reducing furnace, placing the mixture thereon, and performing the reduction treatment in this manner.

<2-4. Separating Step>

In the separating step S4, the metal and the slag which have been generated in the reducing step S3 are separated from each other and the metal is recovered. Specifically, the metal phase in the mixture (mixed product), which contains a metal phase (metal solid phase) and a slag phase (slag solid phase) and is obtained by the reduction and heat treatment of the mixture, is separated from the slag phase and recovered.

As a method for separating the metal phase and slag phase in the mixed product which is composed of the metal phase and the slag phase and is obtained as a solid from each other, for example, methods such as separation by specific gravity and separation by magnetic force can be utilized in addition to removal of unnecessary substances by sieving.

In addition, the metal phase and slag phase obtained can be easily separated from each other since these exhibit poor wettability, and it is possible to easily separate the metal phase and slag phase in the mixed product from each other by imparting an impact to the large mixed product obtained by the treatment in the reducing step S3 described above, for example, falling down the large mixed product at a predetermined falling distance or applying a predetermined vibration to the large mixed product at the time of sieving.

The metal phase is recovered by separating the metal phase and the slag phase from each other in this manner.

EXAMPLES

Hereinafter, the present invention will be described more specifically with reference to Examples and Comparative Examples, but the present invention is not limited to the following Examples at all.

<<1. Application of Carbonaceous Reducing Agent for Surface Deposition>>

[Mixing Treatment Step]

A mixture was obtained by mixing nickel oxide ore as a raw material ore, iron ore, quartz sand and limestone which were flux components, a binder, and a carbonaceous reducing agent (coal powder, carbon content: 85% by weight, average particle diameter: about 200 μm). The carbonaceous reducing agent was contained in an amount to be a proportion of from 17% by mass to 50% by mass depending on the sample when the total value of the amounts of the carbonaceous reducing agent required for reducing nickel oxide (NiO) contained in the nickel oxide ore, which was a raw material ore, and iron oxide ($Fe_2O_3$) without excess or deficiency was taken as 100% by mass.

[Mixture-Molding Step]

Next, moisture was appropriately added to the mixture of raw material powders thus obtained and the mixture was kneaded by hand to form a spherical mixture.

Subsequently, a coal powder, which was a carbonaceous reducing agent (carbonaceous reducing agent for surface deposition), was uniformly coated and deposited on the surface of the spherical mixture obtained. The amount of the carbonaceous reducing agent for surface deposition deposited was set to an amount to be a proportion of from 0% by mass to 15.0% by mass depending on the sample when the amount of the carbonaceous reducing agent for surface deposition required for reducing the nickel oxide and iron oxide contained in the mixture without excess or deficiency was taken as 100% by mass.

Thereafter, the mixture was subjected to a drying treatment in which hot air at from 300° C. to 400° C. was blown onto the mixture so that the mixture had a solid content of about 70% by weight and a water content of about 30% by weight, thereby producing a spherical mixture (pellet, diameter: 17 mm). Incidentally, the composition (excluding carbon) of solid components in the pellets after being subjected to the drying treatment is presented in the following Table 3.

TABLE 3

Composition of solid component in pellet after being dried [Parts by weight]

| Ni | $Fe_2O_3$ | $SiO_2$ | CaO | $Al_2O_3$ | MgO | Others |
|---|---|---|---|---|---|---|
| 1.5 | 53.1 | 14.2 | 5.2 | 3.1 | 5.8 | Binder, carbonaceous reducing agent, and the like |

[Reducing Step]

The pellets produced were charged into a reducing furnace and subjected to a reduction treatment. Specifically, "ash" containing $SiO_2$ as the main component and a small amount of oxides such as $Al_2O_3$ and MgO as other components was spread on the hearth of the reducing furnace in advance and the pellets were placed thereon. Incidentally, in the pellets in which the carbonaceous reducing agent (coal powder) was deposited on the surface, the coal powder which was not deposited on the surface of the pellets because of a great amount was deposited on the surface of the pellets again by being sprinkled from above after the pellets were placed on the hearth.

Thereafter, a nitrogen atmosphere which substantially did not contain oxygen was set, and the pellets were charged into the reducing furnace. Incidentally, the temperature condition at the time of charging was set to 500±20° C.

Next, the reducing temperature was set to 1400° C., and the pellets were reduced and heated in the reducing furnace. The treatment time was set to 15 minutes so that a metal shell was generated on the surface of the pellet and the reduction in the pellet, which was a mixture, efficiently proceeded. After the reduction treatment, the sample was rapidly cooled to room temperature in the nitrogen atmosphere and then taken out into the air.

For the samples taken out from the reducing furnace after being subjected to the reduction treatment, the metallized rate of nickel and the nickel content rate in the metal were analyzed by using an ICP emission spectroscopic analyzer (SHIMAZU S-8100 model) and calculated. Incidentally, the metallized rate of nickel was determined by Equation (1) and the nickel content rate in the metal was determined by Equation (2).

Metallized rate of nickel=amount of metallized Ni in pellet÷(amount of entire Ni in pellet)×100(%)   Equation (1)

Nickel content rate in metal=amount of metallized Ni in pellet÷(total amount of metallized Ni and Fe in pellet)×100(%)   Equation (2)

The amount of coal powder (carbonaceous reducing agent for surface deposition) deposited and the content of coal powder (carbonaceous reducing agent) contained inside the pellet in each pellet sample are presented in the following Table 4. In addition, the measurement results acquired by ICP analysis are presented concurrently.

TABLE 4

|  | Amount of coal coated (%) | Amount of coal in pellet (%) | Metallized rate of nickel (%) | Nickel content in metal (%) |
|---|---|---|---|---|
| Example 1 | 0.1 | 20 | 94.5 | 18.7 |
| Example 2 | 1.0 | 20 | 95.0 | 19.3 |
| Example 3 | 3.0 | 20 | 95.2 | 19.6 |
| Example 4 | 5.0 | 20 | 95.6 | 20.0 |
| Example 5 | 7.0 | 20 | 95.8 | 20.2 |
| Example 6 | 9.5 | 20 | 96.1 | 20.4 |
| Example 7 | 3.0 | 17 | 92.8 | 22.5 |

TABLE 4-continued

|  | Amount of coal coated (%) | Amount of coal in pellet (%) | Metallized rate of nickel (%) | Nickel content in metal (%) |
|---|---|---|---|---|
| Example 8 | 3.0 | 24 | 96.7 | 22.1 |
| Example 9 | 3.0 | 28 | 97.0 | 21.4 |
| Example 10 | 3.0 | 33 | 97.6 | 21.1 |
| Example 11 | 3.0 | 38 | 98.3 | 18.3 |
| Example 12 | 15.0 | 20 | 98.8 | 21.2 |
| Example 13 | 0.5 | 50 | 99.9 | 17.3 |
| Comparative Example 1 | 0 | 20 | 88.2 | 15.5 |

As presented in the results of Table 4, it has been found that it is possible to favorably metallize nickel in the pellet and to produce high grade ferronickel having a nickel content rate of from 18.3% to 22.8% as a pellet in which a carbonaceous reducing agent for surface deposition is deposited on the surface is subjected to a reduction treatment (Example 1 to Example 13).

In contrast, as presented in the results for Comparative Example 1, the metallized rate of nickel was 88.2% to be low and the nickel content rate in the metal was also 15.5% to be a low value as ferronickel in the case of a pellet sample in which a carbonaceous reducing agent for surface deposition was not deposited on the surface.

<<2. Application of Metal Oxide>>

[Mixing Treatment Step]

A mixture was obtained by mixing nickel oxide ore as a raw material ore, iron ore, quartz sand and limestone which were flux components, a binder, and a carbonaceous reducing agent (coal powder, carbon content: 85% by weight, average particle diameter: about 200 µm). The carbonaceous reducing agent was contained in an amount to be a proportion of from 17% by mass to 41% by mass depending on the sample when the amount of the carbonaceous reducing agent required for reducing nickel oxide (NiO) contained in the nickel oxide ore, which was a raw material ore, and iron oxide ($Fe_2O_3$) without excess or deficiency was taken as 100% by mass.

[Mixture-Molding Step]

Next, moisture was appropriately added to the mixture of raw material powders thus obtained and the mixture was kneaded by hand to form a spherical mixture.

Subsequently, a metal oxide was uniformly deposited on the surface of the mixture by rolling the spherical mixture obtained on a container in which nickel oxide (NiO) or iron oxide (FeO), which was a metal oxide, was spread. The amount of the metal oxide deposited was set to an amount to be a proportion of from 0% by mass to 8.0% by mass depending on the sample when the total amount of metals of nickel and iron contained in the pellet to be formed was taken as 100% by mass.

Next, the mixture was subjected to a drying treatment in which hot air at from 300° C. to 400° C. was blown onto the mixture so that the mixture had a solid content of about 70% by weight and a water content of about 30% by weight, thereby producing a spherical mixture (pellet, diameter: 17 mm). Incidentally, the composition (excluding carbon) of solid components in the pellets after being subjected to the drying treatment is presented in the following Table 5.

TABLE 5

| Composition of solid component in pellet after being dried [Parts by weight] | | | | | | |
|---|---|---|---|---|---|---|
| Ni | $Fe_2O_3$ | $SiO_2$ | CaO | $Al_2O_3$ | MgO | Others |
| 1.5 | 53.1 | 14.2 | 5.2 | 3.1 | 5.8 | Binder, carbonaceous reducing agent, and the like |

[Reducing Step]

The pellets produced were charged into a reducing furnace and subjected to a reduction treatment. At this time, "ash" containing $SiO_2$ as the main component and a small amount of oxides such as $Al_2O_3$ and MgO as other components was spread on the hearth of the reducing furnace in advance and the pellets were placed thereon depending on the sample. Incidentally, in the pellets in which the metal oxide was deposited on the surface, the metal oxide which was not deposited on the surface of the pellets because of a great amount was deposited on the surface of the pellets again by being sprinkled from above after the pellets were placed on the hearth.

Thereafter, a nitrogen atmosphere which substantially did not contain oxygen was set, and the pellets were charged into the reducing furnace. Incidentally, the temperature condition at the time of charging was set to 500±20° C.

Next, the reducing temperature was set to 1400° C., and the pellets were reduced and heated in the reducing furnace. The treatment time was set to 15 minutes so that a metal shell was generated on the surface of the pellet and the reduction in the pellet, which was a mixture, efficiently proceeded. After the reduction treatment, the sample was rapidly cooled to room temperature in the nitrogen atmosphere and then taken out into the air.

For the samples taken out from the reducing furnace after being subjected to the reduction treatment, the metallized rate of nickel and the nickel content rate in the metal were analyzed by using an ICP emission spectroscopic analyzer (SHIMAZU S-8100 model) and calculated. Incidentally, the metallized rate of nickel was determined by Equation (1) above and the nickel content rate in the metal was determined by Equation (2) above.

The kind and deposited amount of metal oxide, the content of coal powder (carbonaceous reducing agent) contained inside the pellet, and the presence or absence of the hearth carbonaceous reducing agent in each pellet sample are presented in the following Table 6. In addition, the measurement results acquired by ICP analysis are presented.

TABLE 6

| | Sample | | | | |
|---|---|---|---|---|---|
| | Presence or absence of spreading of carbonaceous reducing agent | Deposition of metal oxide | | Amount of coal in pellet (%) | Metallized rate of nickel (%) | Nickel content in metal (%) |
| | | Oxide | Deposited amount (%) | | | |
| Example 14 | Absence | FeO | 0.05 | 20 | 94.4 | 21.7 |
| Example 15 | Absence | FeO | 0.3 | 20 | 95.0 | 21.3 |
| Example 16 | Absence | FeO | 1.2 | 20 | 95.3 | 20.2 |

TABLE 6-continued

|  | Sample | | | | |
| --- | --- | --- | --- | --- | --- |
|  | Presence or absence of spreading of carbonaceous reducing agent | Deposition of metal oxide | | Amount of coal in pellet (%) | Metallized rate of nickel (%) | Nickel content in metal (%) |
|  |  | Oxide | Deposited amount (%) |  |  |  |
| Example 17 | Absence | FeO | 2.3 | 20 | 95.6 | 19.3 |
| Example 18 | Absence | FeO | 3.4 | 20 | 95.9 | 18.7 |
| Example 19 | Absence | FeO | 4.8 | 20 | 96.2 | 17.5 |
| Example 20 | Absence | FeO | 0.5 | 17 | 92.9 | 22.1 |
| Example 21 | Absence | FeO | 0.5 | 21 | 95.1 | 21.0 |
| Example 22 | Absence | FeO | 0.5 | 24 | 96.5 | 20.3 |
| Example 23 | Absence | FeO | 0.5 | 28 | 97.2 | 19.6 |
| Example 24 | Absence | FeO | 0.5 | 31 | 97.7 | 18.9 |
| Example 25 | Absence | FeO | 0.5 | 34 | 98.0 | 18.3 |
| Example 26 | Absence | NiO | 0.05 | 20 | 94.3 | 18.0 |
| Example 27 | Absence | NiO | 0.3 | 20 | 94.9 | 19.1 |
| Example 28 | Absence | NiO | 1.2 | 20 | 95.3 | 20.4 |
| Example 29 | Absence | NiO | 2.3 | 20 | 95.7 | 21.3 |
| Example 30 | Absence | NiO | 3.4 | 20 | 95.9 | 22.1 |
| Example 31 | Absence | NiO | 4.8 | 20 | 96.3 | 22.8 |
| Example 32 | Absence | NiO | 0.5 | 17 | 92.8 | 21.3 |
| Example 33 | Absence | NiO | 0.5 | 21 | 95.2 | 20.2 |
| Example 34 | Absence | NiO | 0.5 | 24 | 96.4 | 19.7 |
| Example 35 | Absence | NiO | 0.5 | 28 | 97.2 | 19.1 |
| Example 36 | Absence | NiO | 0.5 | 31 | 97.8 | 18.6 |
| Example 37 | Absence | NiO | 0.5 | 34 | 98.1 | 18.0 |
| Example 38 | Presence | FeO | 1.2 | 20 | 95.8 | 19.9 |
| Example 39 | Presence | FeO | 0.5 | 21 | 95.7 | 20.5 |
| Example 40 | Presence | NiO | 1.2 | 20 | 95.7 | 20.0 |
| Example 41 | Presence | NiO | 0.5 | 21 | 95.6 | 19.9 |
| Example 42 | Absence | NiO | 8 | 20 | 98.8 | 16.1 |
| Example 43 | Absence | FeO | 8 | 20 | 98.9 | 24.3 |
| Example 44 | Absence | FeO | 0.5 | 41 | 99.7 | 16.1 |
| Example 45 | Absence | NiO | 0.5 | 41 | 99.6 | 16.3 |
| Example 46 | Presence | FeO | 8 | 20 | 99.1 | 16.7 |
| Example 47 | Presence | NiO | 8 | 20 | 99.3 | 24.8 |
| Example 48 | Presence | FeO | 0.5 | 41 | 99.9 | 16.9 |
| Example 49 | Presence | NiO | 0.5 | 41 | 99.8 | 17.1 |
| Comparative Example 2 | Absence | Absence | 0 | 20 | 90.2 | 15.2 |
| Comparative Example 3 | Presence | Absence | 0 | 20 | 90.8 | 15.6 |

As presented in the results of Table 6, it has been found that it is possible to favorably metallize nickel in the pellet and to produce high grade ferronickel having a nickel content rate of from 16.2% to 24.8% as a pellet in which a metal oxide is deposited on the surface of the mixture is subjected to a reduction treatment (Example 14 to Example 49).

It is considered that the reason why favorable ferronickel can be produced in this manner is because a metal shell is uniformly and stably generated as a metal oxide is deposited on the surface of pellet and a reduction reaction uniformly and stably takes place without leakage of the reducing agent in the metal shell by this.

In contrast, as presented in the results for Comparative Example 2 and Comparative Example 3, the metallized rate of nickel was about 90% to be low and the nickel content rate in the metal was also about 15% to be a low value as ferronickel in the case of a pellet sample in which a metal oxide was not deposited on the surface.

3. Application of Oxidation Inhibitor

Example 50 to Example 109

[Mixing Treatment Step]

A mixture was obtained by mixing nickel oxide ore as a raw material ore, iron ore, quartz sand and limestone which were flux components, a binder, and a carbonaceous reducing agent (coal powder, carbon content: 85% by weight, average particle diameter: about 90 μm) by using a mixing machine while adding an appropriate amount of water thereto. The carbonaceous reducing agent was contained in an amount to be a proportion of 25% when the amount of the carbonaceous reducing agent required for reducing nickel oxide (NiO) contained in the nickel oxide ore, which was a raw material ore, and iron oxide ($Fe_2O_3$) without excess or deficiency was taken as 100%.

[Mixture-Molding Step]

Next, the mixture obtained was granulated by using a pan type granulator and sieved to a size of ϕ15.5±1.0 mm. Thereafter, the sieved samples were equally divided into 60 samples and used as a mixture sample to be subjected to a reduction treatment in the reducing step.

[Reducing Step]

The mixture samples prepared were subjected to a reduction treatment under the conditions presented in the following Tables 8 to 10. Specifically, the mixture samples were charged into a reducing furnace, put in a state in which a specific oxidation inhibitor was presented, and subjected to a reduction and heat treatment at each reducing temperature for each reducing time. In addition, "ash" containing $SiO_2$ as the main component and a small amount of oxides such as $Al_2O_3$ and MgO as other components was spread on the hearth of the reducing furnace in advance and the mixture samples were placed thereon and subjected to the treatment.

Incidentally, the respective mixture samples were subjected to a drying treatment in which hot air at from 170° C. to 250° C. was blown onto the mixture samples so that the mixture samples had a solid content of about 70% by weight and a water content of about 30% by weight before being subjected to the reduction treatment. The composition (excluding carbon) of solid components in the samples after being subjected to the drying treatment is presented in the following Table 7.

TABLE 7

| Composition of solid component after being dried [Parts by weight] | | | | | | |
|---|---|---|---|---|---|---|
| Ni | Fe$_2$O$_3$ | SiO$_2$ | CaO | Al$_2$O$_3$ | MgO | Others |
| 1.6 | 53.3 | 14.0 | 5.4 | 3.2 | 5.7 | Binder, carbonaceous reducing agent, and the like |

Here, the oxidation inhibitor was selected from coal ash, charcoal ash, bamboo charcoal ash, alumina, alumina cement, magnesia, magnesia cement, zirconia, zirconia cement, or mullite and used in the respective Examples.

In addition, as a state in which an oxidation inhibitor is present (denoted as the "method of placing oxidation inhibitor" in the table), either of a mode in which the oxidation inhibitor was sprinkled so as to be put on the upper surface of the mixture (denoted as to be "sprinkled" in the table) as exemplified in FIG. 2 or a mode in which the mixture was buried in the oxidation inhibitor and surrounded so that the surface was not visible (denoted as to be "buried" in the table) as exemplified in FIG. 3 was adopted.

Comparative Example 4 to Comparative Example 6

In Comparative Example 4 to Comparative Example 6, mixture samples were fabricated in the same manner as in Examples, charged into a reducing furnace, and subjected to a reduction and heat treatment, but at this time, the treatment was performed without using an oxidation inhibitor. Incidentally, the reducing temperature and the reducing time were set to be in the same ranges as those in Examples.

For each of the samples taken out from the reducing furnace after being subjected to the reduction and heat treatment of Examples and Comparative Examples, the metallized rate of nickel and the nickel content rate in the metal were analyzed by using an ICP emission spectroscopic analyzer (SHIMAZU S-8100 model) and calculated. The values calculated from the analysis results are concurrently presented in the following Tables 8 to 10. Incidentally, the metallized rate of nickel was determined by Equation (1) above and the nickel content rate in the metal was determined by Equation (2) above.

In addition, the respective samples recovered were pulverized by wet treatment and then the metal was recovered therefrom by magnetic separation. Thereafter, the recovery rate of Ni metal was calculated from the amount of nickel oxide ore fed, the proportion of Ni contained therein, and the amount of recovered Ni. Incidentally, the recovery rate of Ni metal was determined by Equation (3).

Recovery rate of Ni metal=amount of recovered Ni÷(amount of ore charged×proportion of Ni contained in ore)×100(%)     Equation (3)

TABLE 8

| | | Sample | | | | |
|---|---|---|---|---|---|---|
| | Oxidation inhibitor | Method of placing oxidation inhibitor | Reducing temperature (° C.) | Reducing time (Minute) | Metallized rate of nickel (%) | Nickel content in metal (%) | Recovery rate of metal (%) |
| Example 50 | Coal ash | Sprinkled | 1300 | 35 | 93.0 | 17.0 | 92.5 |
| Example 51 | Coal ash | Sprinkled | 1350 | 25 | 93.3 | 17.3 | 92.1 |
| Example 52 | Coal ash | Sprinkled | 1400 | 15 | 93.7 | 17.1 | 92.8 |
| Example 53 | Coal ash | Buried | 1300 | 35 | 94.2 | 18.9 | 93.9 |
| Example 54 | Coal ash | Buried | 1350 | 25 | 94.5 | 18.6 | 93.4 |
| Example 55 | Coal ash | Buried | 1400 | 15 | 94.7 | 18.5 | 93.0 |
| Example 56 | Charcoal ash | Sprinkled | 1300 | 35 | 93.5 | 17.3 | 92.3 |
| Example 57 | Charcoal ash | Sprinkled | 1350 | 25 | 93.2 | 17.2 | 92.8 |
| Example 58 | Charcoal ash | Sprinkled | 1400 | 15 | 93.9 | 17.8 | 92.0 |
| Example 59 | Charcoal ash | Buried | 1300 | 35 | 94.5 | 18.6 | 93.1 |
| Example 60 | Charcoal ash | Buried | 1350 | 25 | 94.2 | 18.3 | 93.7 |
| Example 61 | Charcoal ash | Buried | 1400 | 15 | 94.6 | 18.9 | 93.5 |
| Example 62 | Bamboo charcoal ash | Sprinkled | 1300 | 35 | 93.7 | 17.6 | 92.3 |
| Example 63 | Bamboo charcoal ash | Sprinkled | 1350 | 25 | 93.9 | 17.3 | 92.8 |
| Example 64 | Bamboo charcoal ash | Sprinkled | 1400 | 15 | 93.5 | 17.4 | 92.4 |
| Example 65 | Bamboo charcoal ash | Buried | 1300 | 35 | 94.2 | 18.0 | 93.1 |
| Example 66 | Bamboo charcoal ash | Buried | 1350 | 25 | 94.7 | 18.8 | 93.6 |
| Example 67 | Bamboo charcoal ash | Buried | 1400 | 15 | 94.8 | 18.4 | 93.8 |
| Comparative Example 4 | — | — | 1300 | 35 | 85.0 | 14.3 | 75.0 |
| Comparative Example 5 | — | — | 1350 | 25 | 85.5 | 14.6 | 75.3 |
| Comparative Example 6 | — | — | 1400 | 15 | 85.1 | 14.2 | 75.8 |

TABLE 9

| | Sample | | | | | | |
|---|---|---|---|---|---|---|---|
| | Oxidation inhibitor | Method of placing oxidation inhibitor | Reducing temperature (° C.) | Reducing time (Minute) | Metallized rate of nickel (%) | Nickel content in metal (%) | Recovery rate of metal (%) |
| Example 68 | Alumina | Sprinkled | 1300 | 35 | 93.5 | 17.3 | 92.3 |
| Example 69 | Alumina | Sprinkled | 1350 | 25 | 93.6 | 17.2 | 92.7 |
| Example 70 | Alumina | Sprinkled | 1400 | 15 | 93.0 | 17.4 | 92.6 |
| Example 71 | Alumina | Buried | 1300 | 35 | 94.5 | 18.3 | 93.8 |
| Example 72 | Alumina | Buried | 1350 | 25 | 94.1 | 18.8 | 93.3 |
| Example 73 | Alumina | Buried | 1400 | 15 | 94.8 | 18.7 | 93.0 |
| Example 74 | Alumina cement | Sprinkled | 1300 | 35 | 93.7 | 17.4 | 92.2 |
| Example 75 | Alumina cement | Sprinkled | 1350 | 25 | 93.9 | 17.6 | 92.1 |
| Example 76 | Alumina cement | Sprinkled | 1400 | 15 | 93.5 | 17.8 | 92.6 |
| Example 77 | Alumina cement | Buried | 1300 | 35 | 94.7 | 18.5 | 93.3 |
| Example 78 | Alumina cement | Buried | 1350 | 25 | 94.3 | 18.9 | 93.9 |
| Example 79 | Alumina cement | Buried | 1400 | 15 | 94.6 | 18.0 | 93.8 |
| Example 80 | Magnesia | Sprinkled | 1300 | 35 | 93.1 | 17.3 | 92.7 |
| Example 81 | Magnesia | Sprinkled | 1350 | 25 | 93.0 | 17.1 | 92.7 |
| Example 82 | Magnesia | Sprinkled | 1400 | 15 | 93.5 | 17.7 | 92.3 |
| Example 83 | Magnesia | Buried | 1300 | 35 | 94.4 | 18.8 | 93.8 |
| Example 84 | Magnesia | Buried | 1350 | 25 | 94.7 | 18.3 | 93.5 |
| Example 85 | Magnesia | Buried | 1400 | 15 | 94.6 | 18.9 | 93.3 |
| Example 86 | Magnesia cement | Sprinkled | 1300 | 35 | 93.2 | 17.6 | 92.1 |
| Example 87 | Magnesia cement | Sprinkled | 1350 | 25 | 93.3 | 17.5 | 92.5 |
| Example 88 | Magnesia cement | Sprinkled | 1400 | 15 | 93.7 | 17.3 | 92.0 |
| Example 89 | Magnesia cement | Buried | 1300 | 35 | 94.8 | 18.5 | 93.7 |
| Example 90 | Magnesia cement | Buried | 1350 | 25 | 94.5 | 18.7 | 93.6 |
| Example 91 | Magnesia cement | Buried | 1400 | 15 | 94.2 | 18.9 | 93.8 |

TABLE 10

| | Sample | | | | | | |
|---|---|---|---|---|---|---|---|
| | Oxidation inhibitor | Method of placing oxidation inhibitor | Reducing temperature (° C.) | Reducing time (Minute) | Metallized rate of nickel (%) | Nickel content in metal (%) | Recovery rate of metal (%) |
| Example 92 | Zirconia | Sprinkled | 1300 | 35 | 93.1 | 17.4 | 92.2 |
| Example 93 | Zirconia | Sprinkled | 1350 | 25 | 93.8 | 17.0 | 92.3 |
| Example 94 | Zirconia | Sprinkled | 1400 | 15 | 93.7 | 17.5 | 92.6 |
| Example 95 | Zirconia | Buried | 1300 | 35 | 94.5 | 18.3 | 93.5 |
| Example 96 | Zirconia | Buried | 1350 | 25 | 94.5 | 18.8 | 93.0 |
| Example 97 | Zirconia | Buried | 1400 | 15 | 94.2 | 18.6 | 93.8 |
| Example 98 | Zriconia cement | Sprinkled | 1300 | 35 | 93.3 | 17.3 | 92.1 |
| Example 99 | Zirconia cement | Sprinkled | 1350 | 25 | 93.8 | 17.0 | 92.9 |
| Example 100 | Zirconia cement | Sprinkled | 1400 | 15 | 93.0 | 17.1 | 92.5 |
| Example 101 | Zirconia cement | Buried | 1300 | 35 | 94.3 | 18.9 | 93.8 |
| Example 102 | Zirconia cement | Buried | 1350 | 25 | 94.5 | 18.8 | 93.7 |
| Example 103 | Zirconia cement | Buried | 1400 | 15 | 94.7 | 18.4 | 93.7 |
| Example 104 | Mullite | Sprinkled | 1300 | 35 | 93.9 | 17.0 | 92.3 |
| Example 105 | Mullite | Sprinkled | 1350 | 25 | 93.2 | 17.5 | 92.1 |
| Example 106 | Mullite | Sprinkled | 1400 | 15 | 93.5 | 17.6 | 92.7 |
| Example 107 | Mullite | Buried | 1300 | 35 | 94.8 | 18.3 | 93.6 |

TABLE 10-continued

|  | Oxidation inhibitor | Method of placing oxidation inhibitor | Reducing temperature (° C.) | Reducing time (Minute) | Metallized rate of nickel (%) | Nickel content in metal (%) | Recovery rate of metal (%) |
|---|---|---|---|---|---|---|---|
| Example 108 | Mullite | Buried | 1350 | 25 | 94.0 | 18.9 | 93.9 |
| Example 109 | Mullite | Buried | 1400 | 15 | 94.2 | 18.2 | 93.0 |

As presented in the results of Tables 8 to 10, in Example 50 to Example 109 in which the mixture sample was subjected to the reduction treatment in a state in which an oxidation inhibitor was present, favorable results were obtained as the metallized rate of nickel, the nickel content in the metal, and the recovery rate of metal were all high values. It is considered that this is because the invasion of oxygen into the mixture is prevented and the oxidation can be effectively suppressed as the mixture sample is subjected to the reduction treatment in a state in which an oxidation inhibitor is present.

On the other hand, in Comparative Example 4 to Comparative Example 6 in which the oxidation inhibitor was not used, although other conditions for the reduction treatment were equivalent, the metallized rate of nickel was from 85.0% to 85.5%, the nickel content in the metal was from 14.2% to 14.6%, the recovery rate of metal was from 75.0% to 75.8%, and these were all clearly lower values as compared with those in Examples.

From the results described above, it has been found that it is possible to obtain a metal containing nickel at a high efficiency by subjecting a mixture containing nickel oxide ore of a raw material to a reduction treatment in a state in which an oxidation inhibitor is present.

Example 110 to Example 169

[Mixing Treatment Step]

A mixture was obtained by mixing nickel oxide ore as a raw material ore, iron ore, quartz sand and limestone which were flux components, a binder, and a carbonaceous reducing agent (coal powder, carbon content: 85% by weight, average particle diameter: about 83 µm) by using a mixing machine while adding an appropriate amount of water thereto. The carbonaceous reducing agent was contained in an amount to be a proportion of 27% when the amount of the carbonaceous reducing agent required for reducing nickel oxide (NiO) contained in the nickel oxide ore, which was a raw material ore, and iron oxide ($Fe_2O_3$) without excess or deficiency was taken as 100%.

[Mixture-Molding Step]

Next, the mixture obtained was granulated by using a pan type granulator and sieved to a size of ϕ14.5±1.0 mm. Thereafter, the sieved samples were equally divided into 60 samples and used as a mixture sample to be subjected to a reduction treatment in the reducing step.

[Reducing Step]

The mixture samples prepared were subjected to a reduction treatment under the conditions presented in the following Tables 11 to 15. Specifically, the mixture samples were charged into a reducing furnace, put in a state in which a specific oxidation inhibitor was present, and subjected to a reduction and heat treatment at each reducing temperature for each reducing time. In addition, "ash" containing $SiO_2$ as the main component and a small amount of oxides such as $Al_2O_3$ and MgO as other components was spread on the hearth of the reducing furnace in advance and the mixture samples were placed thereon and subjected to the treatment.

Incidentally, the respective mixture samples were subjected to a drying treatment in which hot air at from 170° C. to 250° C. was blown onto the mixture samples so that the mixture samples had a solid content of about 70% by weight and a water content of about 30% by weight before being subjected to the reduction treatment. The composition of solid components in the samples after being subjected to the drying treatment was the same as those in Table 7 above.

Here, an oxidation inhibiting mixture obtained by mixing an oxide mixture having an oxide content of 90% by mass or more with coal, which was a carbonaceous reducing agent, was used as the oxidation inhibitor. The oxide mixture was selected from alumina, alumina cement, magnesia, magnesia cement, zirconia, zirconia cement, or mullite and used in the respective Examples. Incidentally, the mixing ratio of the oxide mixture to the coal in the oxidation inhibiting mixture was 9:1 as the weight ratio.

In addition, as a state in which an oxidation inhibitor is present (denoted as the "method of placing oxidation inhibitor" in the table), either of a mode in which the oxidation inhibitor was sprinkled so as to be put on the upper surface of the mixture (denoted as to be "sprinkled" in the table) as exemplified in FIG. 2 or a mode in which the mixture was buried in and surrounded with the oxidation inhibitor so that the surface was not visible (denoted as to be "buried" in the table) as exemplified in FIG. 3 was adopted.

<<Evaluation>>

For the samples taken out from the reducing furnace after being subjected to the reduction and heat treatment, the metallized rate of nickel and the nickel content rate in the metal were determined. In addition, the respective samples recovered were pulverized by wet treatment, then the metal was recovered therefrom by magnetic separation, and the recovery rate of Ni metal was calculated. The values calculated from the analysis results are concurrently presented in the following Tables 11 to 15.

TABLE 11

|  | Oxidation inhibiting mixture (Oxidation inhibitor, coal) | Method of placing oxidation inhibitor | Reducing temperature (° C.) | Reducing time (Minute) | Metallized rate of nickel (%) | Nickel content in metal (%) | Recovery rate of metal (%) |
|---|---|---|---|---|---|---|---|
| Example 110 | Coal ash, coal | Sprinkled | 1300 | 35 | 94.1 | 17.5 | 92.9 |
| Example 111 | Coal ash, coal | Sprinkled | 1350 | 25 | 94.2 | 17.8 | 92.6 |

TABLE 11-continued

| | Sample | | | | | | |
|---|---|---|---|---|---|---|---|
| | Oxidation inhibiting mixture (Oxidation inhibitor, coal) | Method of placing oxidation inhibitor | Reducing temperature (° C.) | Reducing time (Minute) | Metallized rate of nickel (%) | Nickel content in metal (%) | Recovery rate of metal (%) |
| Example 112 | Coal ash, coal | Sprinkled | 1400 | 15 | 94.7 | 17.6 | 93.2 |
| Example 113 | Coal ash, coal | Buried | 1300 | 35 | 95.2 | 19.3 | 93.4 |
| Example 114 | Coal ash, coal | Buried | 1350 | 25 | 95.4 | 19.1 | 93.9 |
| Example 115 | Coal ash, coal | Buried | 1400 | 15 | 95.8 | 19.0 | 93.5 |
| Example 116 | Charcoal ash, coal | Sprinkled | 1300 | 35 | 94.5 | 17.7 | 92.8 |
| Example 117 | Charcoal ash, coal | Sprinkled | 1350 | 25 | 94.3 | 17.7 | 93.2 |
| Example 118 | Charcoal ash, coal | Sprinkled | 1400 | 15 | 94.9 | 18.3 | 92.6 |
| Example 119 | Charcoal ash, coal | Buried | 1300 | 35 | 95.6 | 19.0 | 93.1 |
| Example 120 | Charcoal ash, coal | Buried | 1350 | 25 | 95.2 | 18.8 | 93.9 |
| Example 121 | Charcoal ash, coal | Buried | 1400 | 15 | 95.6 | 19.3 | 93.8 |
| Example 122 | Bamboo charcoal ash, coal | Sprinkled | 1300 | 35 | 94.6 | 18.0 | 92.8 |
| Example 123 | Bamboo charcoal ash, coal | Sprinkled | 1350 | 25 | 94.9 | 17.8 | 93.2 |
| Example 124 | Bamboo charcoal ash, coal | Sprinkled | 1400 | 15 | 94.6 | 17.9 | 92.9 |
| Example 125 | Bamboo charcoal ash, coal | Buried | 1300 | 35 | 95.3 | 18.4 | 93.6 |
| Example 126 | Bamboo charcoal ash, coal | Buried | 1350 | 25 | 95.7 | 19.3 | 94.1 |
| Example 127 | Bamboo charcoal ash, coal | Buried | 1400 | 15 | 95.9 | 18.9 | 94.3 |

TABLE 12

| | Sample | | | | | | |
|---|---|---|---|---|---|---|---|
| | Oxidation inhibiting mixture (Oxidation inhibitor, coal) | Method of placing oxidation inhibitor | Reducing temperature (° C.) | Reducing time (Minute) | Metallized rate of nickel (%) | Nickel content in metal (%) | Recovery rate of metal (%) |
| Example 128 | Alumina, coal | Sprinkled | 1300 | 35 | 94.5 | 17.8 | 92.8 |
| Example 129 | Alumina, coal | Sprinkled | 1350 | 25 | 94.7 | 17.7 | 93.2 |
| Example 130 | Alumina, coal | Sprinkled | 1400 | 15 | 94.0 | 17.8 | 93.1 |
| Example 131 | Alumina, coal | Buried | 1300 | 35 | 95.6 | 18.8 | 94.2 |
| Example 132 | Alumina, coal | Buried | 1350 | 25 | 95.1 | 19.2 | 93.8 |
| Example 133 | Alumina, coal | Buried | 1400 | 15 | 95.7 | 19.1 | 93.5 |
| Example 134 | Alumina cement, coal | Sprinkled | 1300 | 35 | 94.6 | 17.8 | 92.7 |
| Example 135 | Alumina cement, coal | Sprinkled | 1350 | 25 | 94.9 | 18.0 | 92.6 |
| Example 136 | Alumina cement, coal | Sprinkled | 1400 | 15 | 94.6 | 18.3 | 93.1 |
| Example 137 | Alumina cement, coal | Buried | 1300 | 35 | 95.8 | 18.9 | 93.8 |
| Example 138 | Alumina cement, coal | Buried | 1350 | 25 | 95.3 | 19.4 | 94.3 |
| Example 139 | Alumina cement, coal | Buried | 1400 | 15 | 95.6 | 18.5 | 94.5 |

TABLE 13

| | Sample | | | | | | |
|---|---|---|---|---|---|---|---|
| | Oxidation inhibiting mixture (Oxidation inhibitor, coal) | Method of placing oxidation inhibitor | Reducing temperature (° C.) | Reducing time (Minute) | Metallized rate of nickel (%) | Nickel content in metal (%) | Recovery rate of metal (%) |
| Example 140 | Magnesia, coal | Sprinkled | 1300 | 35 | 94.3 | 17.8 | 93.2 |
| Example 141 | Magnesia, coal | Sprinkled | 1350 | 25 | 94.0 | 17.6 | 93.3 |
| Example 142 | Magnesia, coal | Sprinkled | 1400 | 15 | 94.5 | 18.2 | 92.8 |
| Example 143 | Magnesia, coal | Buried | 1300 | 35 | 95.4 | 19.3 | 94.3 |
| Example 144 | Magnesia, coal | Buried | 1350 | 25 | 95.6 | 18.8 | 94.1 |
| Example 145 | Magnesia, coal | Buried | 1400 | 15 | 95.6 | 19.3 | 93.8 |
| Example 146 | Magnesia cement, coal | Sprinkled | 1300 | 35 | 94.0 | 18.0 | 92.6 |

TABLE 13-continued

| | Sample | | | | | | |
|---|---|---|---|---|---|---|---|
| | Oxidation inhibiting mixture (Oxidation inhibitor, coal) | Method of placing oxidation inhibitor | Reducing temperature (° C.) | Reducing time (Minute) | Metallized rate of nickel (%) | Nickel content in metal (%) | Recovery rate of metal (%) |
| Example 147 | Magnesia cement, coal | Sprinkled | 1350 | 25 | 94.3 | 17.9 | 92.9 |
| Example 148 | Magnesia cement, coal | Sprinkled | 1400 | 15 | 94.5 | 17.8 | 92.6 |
| Example 149 | Magnesia cement, coal | Buried | 1300 | 35 | 95.8 | 18.9 | 94.3 |
| Example 150 | Magnesia cement, coal | Buried | 1350 | 25 | 95.6 | 19.2 | 93.9 |
| Example 151 | Magnesia cement, coal | Buried | 1400 | 15 | 95.2 | 19.3 | 94.3 |

TABLE 14

| | Sample | | | | | | |
|---|---|---|---|---|---|---|---|
| | Oxidation inhibiting mixture (Oxidation inhibitor, coal) | Method of placing oxidation inhibitor | Reducing temperature (° C.) | Reducing time (Minute) | Metallized rate of nickel (%) | Nickel content in metal (%) | Recovery rate of metal (%) |
| Example 152 | Zirconia, coal | Sprinkled | 1300 | 35 | 94.2 | 17.8 | 92.8 |
| Example 153 | Zirconia, coal | Sprinkled | 1350 | 25 | 94.8 | 17.5 | 92.9 |
| Example 154 | Zirconia, coal | Sprinkled | 1400 | 15 | 94.6 | 18.1 | 93.1 |
| Example 155 | Zirconia, coal | Buried | 1300 | 35 | 95.7 | 18.7 | 93.9 |
| Example 156 | Zirconia, coal | Buried | 1350 | 25 | 95.5 | 19.3 | 93.6 |
| Example 157 | Zirconia, coal | Buried | 1400 | 15 | 95.2 | 19.0 | 94.3 |
| Example 158 | Zirconia cement, coal | Sprinkled | 1300 | 35 | 94.1 | 17.8 | 92.7 |
| Example 159 | Zirconia cement, coal | Sprinkled | 1350 | 25 | 94.8 | 17.4 | 93.4 |
| Example 160 | Zirconia cement, coal | Sprinkled | 1400 | 15 | 94.2 | 17.6 | 92.9 |
| Example 161 | Zirconia cement, coal | Buried | 1300 | 35 | 95.3 | 19.4 | 94.3 |
| Example 162 | Zirconia cement, coal | Buried | 1350 | 25 | 95.7 | 19.3 | 94.3 |
| Example 163 | Zirconia cement, coal | Buried | 1400 | 15 | 95.7 | 18.8 | 94.2 |

TABLE 15

| | Sample | | | | | | |
|---|---|---|---|---|---|---|---|
| | Oxidation inhibiting mixture (Oxidation inhibitor, coal) | Method of placing oxidation inhibitor | Reducing temperature (° C.) | Reducing time (Minute) | Metallized rate of nickel (%) | Nickel content in metal (%) | Recovery rate of metal (%) |
| Example 164 | Mullite, coal | Sprinkled | 1300 | 35 | 94.9 | 17.6 | 92.8 |
| Example 165 | Mullite, coal | Sprinkled | 1350 | 25 | 94.1 | 18.0 | 92.5 |
| Example 166 | Mullite, coal | Sprinkled | 1400 | 15 | 94.7 | 18.2 | 93.5 |
| Example 167 | Mullite, coal | Buried | 1300 | 35 | 95.9 | 18.8 | 94.1 |
| Example 168 | Mullite, coal | Buried | 1350 | 25 | 95.2 | 19.4 | 94.5 |
| Example 169 | Mullite, coal | Buried | 1400 | 15 | 95.3 | 18.6 | 93.6 |

As presented in the results of Tables 11 to 15, favorable results were obtained as the metallized rate of nickel, the nickel content in the metal, and the recovery rate of metal were all high values by subjecting the mixture sample to a reduction treatment in a state in which an oxidation inhibitor composed of an oxidation inhibiting mixture is present. In particular, the metallized rate of nickel was stably increased to a high value of 94% or more as compared with that in Example 50 to Example 109.

EXPLANATION OF REFERENCE NUMERALS

10 MIXTURE
11 SURFACE DEPOSIT
20 HEARTH OF REDUCING FURNACE
21 HEARTH COVERING MATERIAL

The invention claimed is:
1. An oxide ore smelting method, comprising obtaining a metal of a reduction product and slag by mixing an oxide ore and a carbonaceous reducing agent, heating the mixture obtained, and subjecting the mixture to a reduction treatment, wherein the oxide ore is nickel oxide ore, an amount of the carbonaceous reducing agent present inside the mixture together with the nickel oxide ore is set to a proportion of 40.0% by mass or less when an amount of the carbonaceous reducing agent required for reducing nickel oxide and iron oxide contained in the mixture without excess or deficiency is taken as 100% by mass, the reduction treatment is performed in a state in which at least the carbonaceous reducing agent is deposited as a surface deposit on a surface of the mixture so that an amount of the carbonaceous reducing agent deposited on the surface of the mixture is set to a proportion of 0.1% by mass or more and 20.0% by mass or less when an amount of the carbonaceous reducing agent required for reducing nickel oxide and iron oxide contained in the mixture without excess or deficiency is taken as 100% by mass.

2. The oxide ore smelting method according to claim 1, wherein the surface deposit is put on an upper surface of the mixture when the reduction treatment is performed.

3. The oxide ore smelting method according to claim 1, wherein the mixture is surrounded with the surface deposit when the reduction treatment is performed.

4. The oxide ore smelting method according to claim 1, wherein the reduction treatment is performed in a state in which the mixture is charged into a reducing furnace having the carbonaceous reducing agent spread on a hearth in advance and the mixture is placed on the carbonaceous reducing agent.

5. The oxide ore smelting method according to claim 1, wherein a reducing temperature in the reduction treatment is set to 1200° C. or more and 1450° C. or less.

* * * * *